US007210882B2

(12) United States Patent
Andersen et al.

(10) Patent No.: US 7,210,882 B2
(45) Date of Patent: May 1, 2007

(54) SYSTEM AND PROCESS FOR TRANSPORTING WIND TURBINES

(75) Inventors: Karsten Andersen, Lake Oswego, OR (US); Scott Landrum, Keller, TX (US)

(73) Assignee: Vestas-American Wind Technology, Portland, OR (US)

( * ) Notice: Subject to any disclaimer, the term of this patent is extended or adjusted under 35 U.S.C. 154(b) by 0 days.

(21) Appl. No.: 10/613,396

(22) Filed: Jul. 3, 2003

(65) Prior Publication Data

US 2005/0002749 A1 Jan. 6, 2005

(51) Int. Cl.
*B60P 1/64* (2006.01)

(52) U.S. Cl. .................................................. 410/82

(58) Field of Classification Search .................. 410/82, 410/2, 35, 36, 44, 46, 47, 101

See application file for complete search history.

(56) References Cited

U.S. PATENT DOCUMENTS

| | | | | | |
|---|---|---|---|---|---|
| 3,971,491 | A | * | 7/1976 | Mowatt-Larssen et al. | 220/647 |
| 4,412,774 | A | * | 11/1983 | Legrand et al. | 414/589 |
| 4,745,952 | A | * | 5/1988 | French | 141/1 |
| 4,782,561 | A | | 11/1988 | Hayama | |
| 4,844,672 | A | | 7/1989 | Yurgevich | |
| 4,925,349 | A | * | 5/1990 | Yurgevich | 410/54 |
| 5,346,084 | A | | 9/1994 | Jurgevich | |
| 5,997,228 | A | * | 12/1999 | Potter | 410/155 |
| 6,210,088 | B1 | * | 4/2001 | Crosby | 410/35 |
| 6,278,198 | B1 | * | 8/2001 | Willis et al. | 290/55 |
| 6,336,765 | B1 | | 1/2002 | Watanabe | |
| 6,408,575 | B1 | | 6/2002 | Yoshida et al. | |
| 6,422,795 | B2 | * | 7/2002 | Holt et al. | 410/115 |
| 6,470,645 | B1 | * | 10/2002 | Maliszewski et al. | 52/745.18 |
| 6,522,025 | B2 | * | 2/2003 | Willis et al. | 290/55 |
| 6,782,667 | B2 | * | 8/2004 | Henderson | 52/116 |
| 2002/0047277 | A1 | * | 4/2002 | Willis et al. | 290/55 |
| 2002/0171247 | A1 | * | 11/2002 | Willis et al. | 290/55 |
| 2003/0175089 | A1 | | 9/2003 | Almind | |
| 2004/0091346 | A1 | * | 5/2004 | Wobben | 414/563 |
| 2004/0262926 | A1 | * | 12/2004 | Hansen | 290/44 |

FOREIGN PATENT DOCUMENTS

| | | | |
|---|---|---|---|
| EP | 1336755 | * | 8/2003 |
| WO | 200204321 | * | 1/2002 |
| WO | 2064485 | * | 8/2002 |
| WO | 2083523 | * | 10/2002 |
| WO | 3100248 | * | 12/2003 |

* cited by examiner

*Primary Examiner*—H Gutman
(74) *Attorney, Agent, or Firm*—Thelen Reid Brown Raysman & Steiner LLP

(57) ABSTRACT

A system is used to transport wind turbines on railroad cars. The wind turbines are partially disassembled into four types of components—nacelles, blades, rotor hubs and tower sections. The blades are stored in cargo containers suitable for use in multi-mode transportation of freight by ship, rail and truck. The nacelles and rotor hubs are not stored in containers but are affixed to transport structures. Brackets are affixed to the tower sections. Then the components are mounted on railroad cars.

26 Claims, 24 Drawing Sheets

60
62
70
72
74
76
78
80
100

SYSTEM AND PROCESS FOR TRANSPORTING WIND TURBINES

BACKGROUND OF THE INVENTION

1. Field of the Invention

The present invention relates to wind turbines, and more particularly, to transporting wind turbines on railroad cars.

2. Background

Wind turbines are used to generate electrical power, and conventional wind turbine 1 is illustrated in FIG. 1. The turbine 1 is mounted on the ground 5 and includes a tower 6 comprised of a plurality of sections with a nacelle 10 mounted on top. A rotor 12 is affixed to the front of the nacelle 10 and blades 14 are connected to the rotor 12. The tower 6 is comprised of sections including base member 16, intermediate members 17 and a top member 18.

Turning now to FIG. 2 the components of nacelle 10 of a conventional wind turbine 1 are illustrated. The nacelle 10 is rotatably mounted on the upper flange 15 of the top tower member 18 through a bearing 19 having an inner race and outer race connected to flange 15. The inner race of the bearing 19 is connected to an annular nacelle mounting plate 20 having a larger diameter than the outer diameter of the top tower member 18.

The nacelle 10 has a cylinder-like configuration extending horizontally and both ends are closed. The nacelle 10 includes a front nacelle section 21A and a rear nacelle section 21B. The nacelle 10 has holes 22 and 23 disposed opposite to each other on the upper and lower surfaces thereof, respectively. The hole 22 provided on the upper surface of the nacelle 10 is closed by a lid 22*a*, after the nacelle 21 is mounted on the tower 6.

A front supporting member 24 and rear supporting member 25 are installed on the floor surface of the front nacelle section 21*a* and rear nacelle section 21*b*. The respective supporting members 24, 25 are connected through a plurality of L-shaped mounting members 26 with the mounting plate 20. In the front nacelle section 21A a rotation shaft 32 for supporting a rotor hub 31, a bearing box 33 for supporting the rotation shaft 32, a gear box 34 for changing the revolution speed of the rotation shaft 32, a brake 35 and a shaft 36, are disposed.

In the rear nacelle section 21B a generator 37 connected to the shaft 36, a controller 38, and hydraulic power sources 39 are disposed. A drive shaft 40 is disposed between the gear box 34 and the generator 37 to transmit power from the gear box 34 to the generator 37. A yaw motor 41 is mounted on the nacelle mounting plate 20 in order to rotate the nacelle 10. An output shaft of the yaw motor 41 is provided with a drive gear (not shown) and the drive gear meshes with the gear formed on the outer periphery of the outer race of the bearing 19 so that the rotation of the yaw motor 41 adjusts the direction of the nacelle 10.

Various components of a wind turbine are often manufactured in different parts of the world and then transported to a site and assembled and erected at the site. As one example, a manufacturer who wishes to assemble a tower in the United States may have the towers manufactured in Korea, the nacelles manufactured in Denmark and the blades manufactured in Germany. The components are shipped by ocean liners to the US and then loaded onto railroad cars and/or trucks for transportation to the assembly site where they are erected. Some types of wind turbines are relatively large structures which have some fragile components, and therefore they must be transported carefully to avoid damage.

Cargo containers, sometimes called intermodal containers, are commonly used for transportation of goods by a variety of methods. Such cargo containers are designed for shipment by ship, railroad and truck so that the cargo can be packed into the container at the beginning of the trip and then transported to the destination by more than one mode of transportation with out the need to load and unload the container when changing from one transportation mode to another. A conventional intermodal cargo container is taught in U.S. Pat. No. 4,782,561.

As described in U.S. Pat. No. 4,782,561 the intermodal cargo containers each have eight corners, and mounted on each corner is a corner fitting which includes three standard sized and shaped slots, one at each face of the container. The corner fittings cooperate with twist locking devices which enable a user to connect and disconnect the corners of a container to corresponding corners of another container thus permitting two containers to be connected to one another in a stable manner during transit and then disconnected from each other as required.

SUMMARY OF THE INVENTION

The system is used to transport wind turbines on railroad cars. The wind turbines are partially disassembled into four types of components—nacelles, blades, rotor hubs, and tower sections. The blades are stored in cargo containers suitable for use in multi-mode transportation of freight by ship, rail and truck. The nacelles and rotor hubs are not stored in containers but are affixed to transport structures. Brackets are affixed to the tower sections. Then the components are mounted on the decks of railroad cars.

The cargo containers are of standard construction, having a standard corner fitting at each corner thereof. The transport structures have holes in their ends. The railroad cars have brackets and stops welded thereto for cooperation with the standard corner fittings and with the holes in the transport structures.

Conventional twist lock connectors are installed in brackets located on a railroad car. Then the containers are lowered onto the railroad cars with their corner fittings aligned with the twist lock connectors, and the connectors are engaged with the corner fittings to form a secure connection. The nacelles with their transport structures are lowered onto the railroad cars so that the holes on the transport structures are aligned with the holes in the brackets, and then a pin is installed to connect them together. Once these connections have been made the railroad cars can be moved.

It is an object of the present invention to provide a system and process for transporting a wind turbine by railroad efficiently and at reduced cost.

DESCRIPTION OF THE PREFERRED EMBODIMENTS

Figure 3:
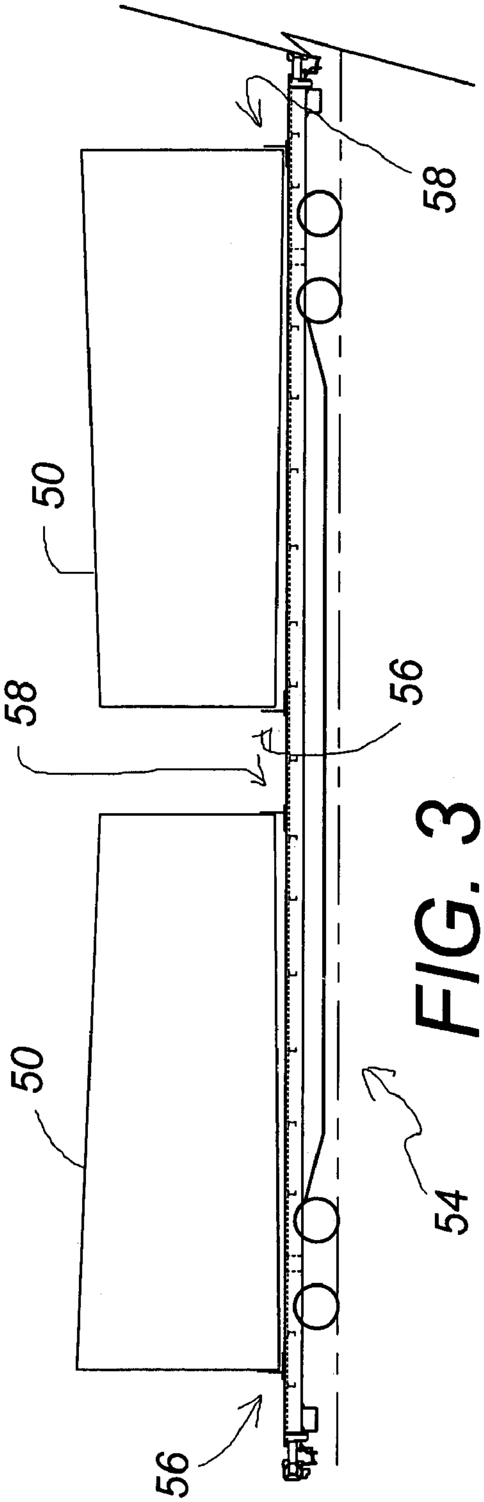
FIG. 3 is an elevation view of one embodiment of the present invention, showing tower sections.
Figure 4:
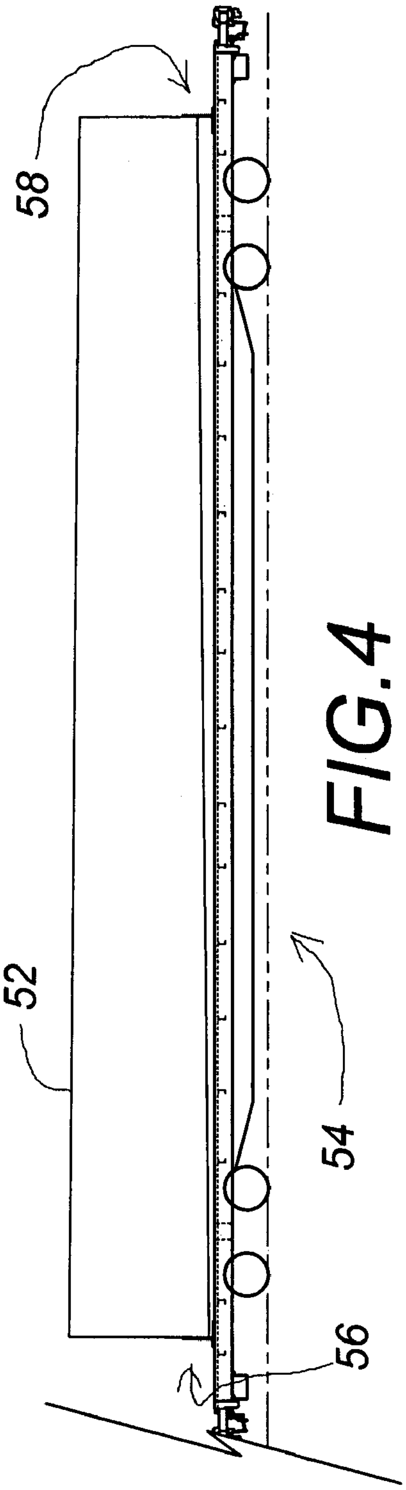
FIG. 4 is another elevation view of the embodiment shown in FIG. 3.

Turning to FIGS. 3–16, the railroad transportation system for the tower sections is illustrated. With reference to FIGS. 3 and 4, bottom tower sections 50 and top tower sections 52 are located on railroad cars 54. It should be noted that the tower sections are substantially cylindrical and the bottom tower sections 50 are roughly half the length of the top tower sections 52. Middle tower sections are not shown since they are similar in length to the top sections 52 and are transported in the same way as the top tower sections 52. The tower sections 52 and 50 are connected to the rail cars 54 by mounting systems 56 and 58 which will be further described below.

Figure 5:
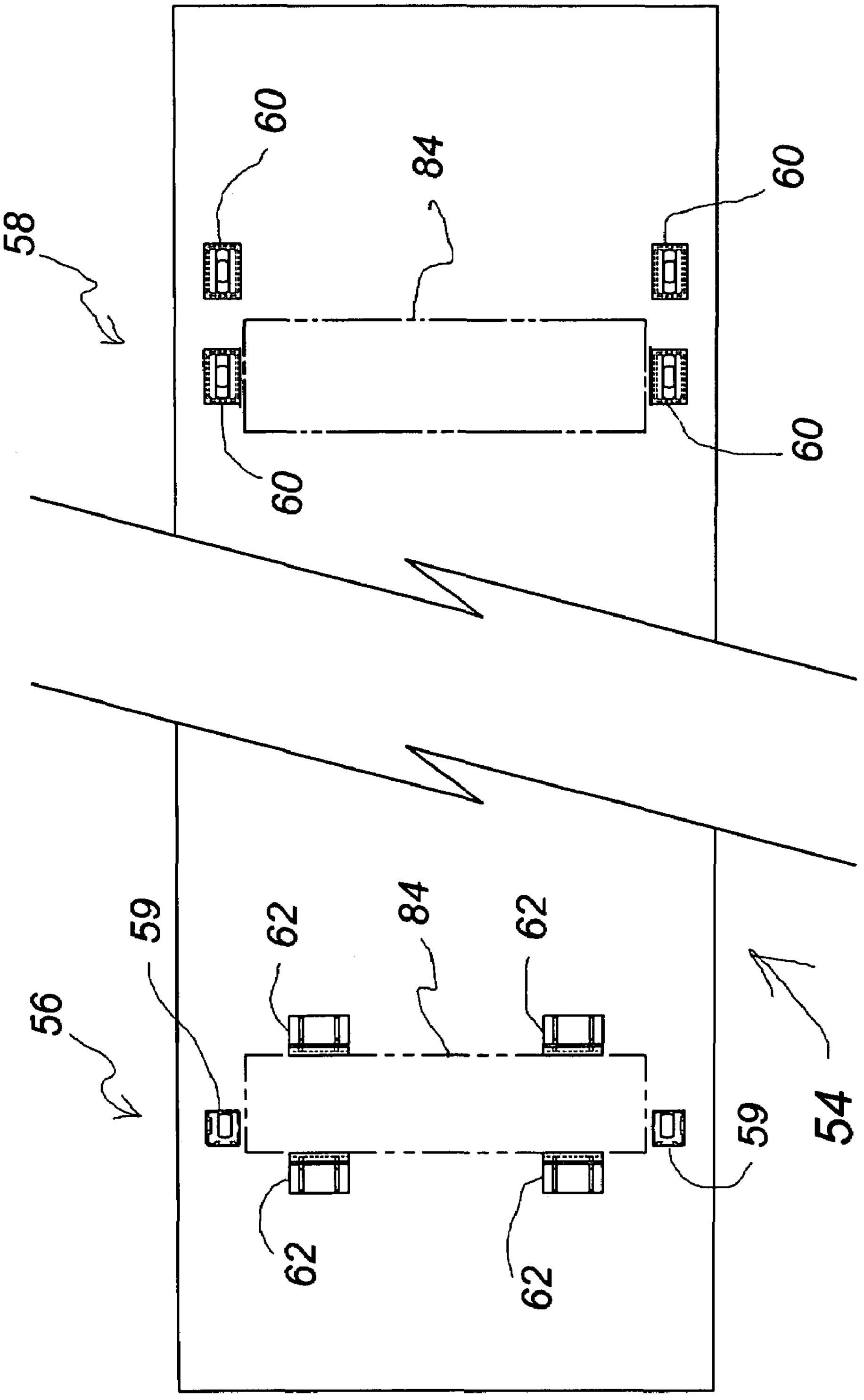
FIG. 5 is a plan view of part of the system shown in FIG. 4.

With reference to FIG. 5 it can be understood that there are two types of mounting systems, a first type 56 and a second type 58. The first type of mounting system 56 includes two short deck slot pedestals 59 and four end stops 62, each of which is welded to the deck of the rail car 54 near one end of the car 54. The second type of mounting system 58 is located near the end of the rail car opposite the first type of mounting system 56, and the second type 58 includes four deck slot pedestals 60, each of which is welded to the deck of the rail car 54.

Figures 6, 7, 8, 9, 10, 11:
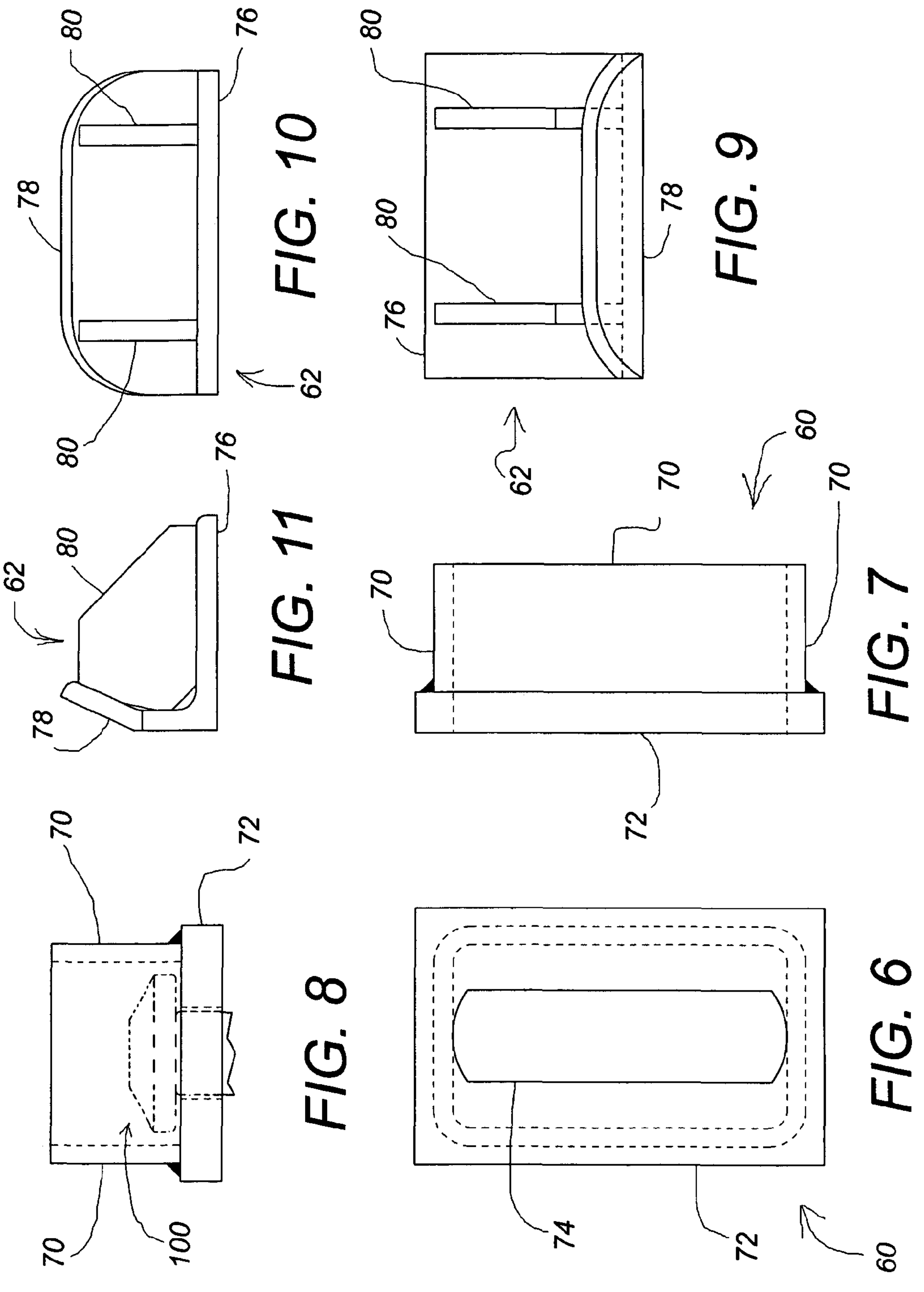
FIGS. 6–11 show components of the embodiment shown in FIG. 3.

Turning to FIGS. 6–8, details of the deck slot pedestals 60 are shown. Each deck slot pedestal 60 comprises a substantially box like structure having four sides 70 and a top 72. A slot 74 is formed in the top 72 and is shaped and sized to cooperate with a standard twist lock 100. The slot 74 is considerably longer than necessary to accommodate a twist lock 100 so that the twist lock can be located in different positions along the length of the slot depending on the length of the tower section to be mounted to the pedestal 60. On the other hand, the short deck slot pedestals 59 are shorter than pedestals 60 because the end of the tower section affixed to the short deck slot pedestals 59 is constrained in its location by the end stops 62.

Figure 17:
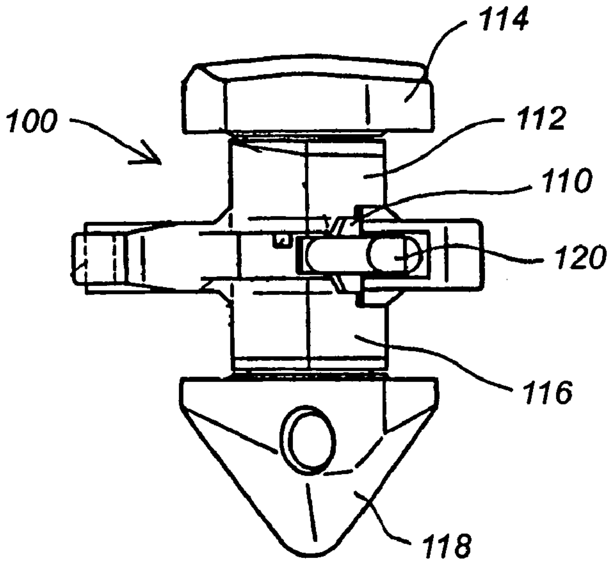
FIGS. 17–18 show conventional twist locks which can be used with the embodiments shown in FIGS. 3–16.
Figure 18:
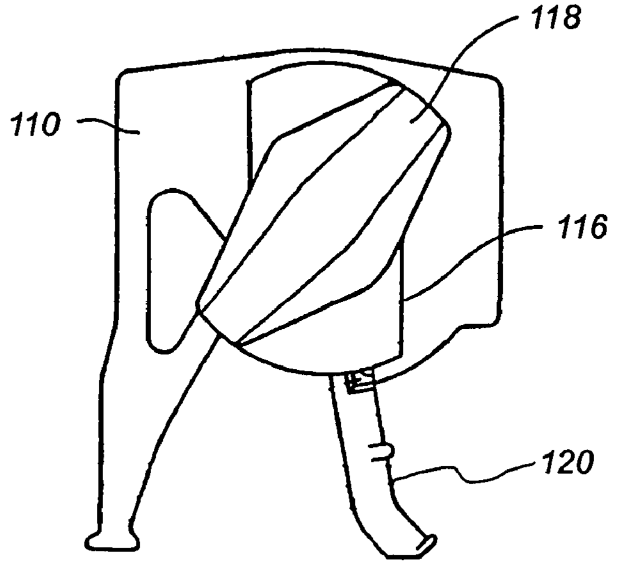

There are a number of designs for standard twist locks, and one twist lock 100 which can be used with the present embodiment is taught in U.S. Pat. No. 4,782,561, the teachings of which are incorporated herein by reference. Turning to FIGS. 17 and 18 the twist lock 100 described in U.S. Pat. No. 4,782,561 includes a body 110 with a first projection 112 and a first lock 114 mounted above the first projection 112. A second projection 116 is connected to the body 110 and a second lock 118 is mounted below the second projection 116. A handle 120 is connected to the body and to the first and second locks 114 and 116 to enable a user to operate the locks 114 and 116. In use, the user can engage the upper and lower locks with corresponding slots in a cargo container to connect cargo containers to one another.

Turning to FIGS. 9–11, details of end stops 62 are shown. Each end stop 62 comprises a flat base 76, a vertical member 78 having a curved upper portion and two supports 80 which are mounted to the base and to the vertical member.

Figure 12:
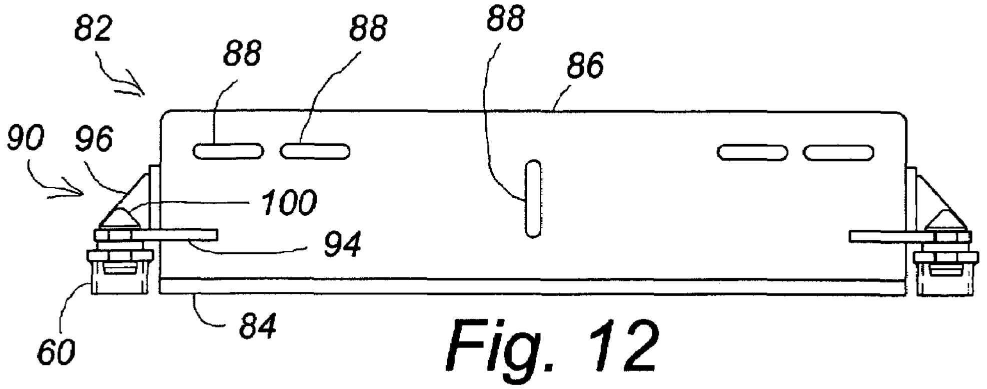
FIGS. 12–15 show components of a system for mounting a tower section on a rail car.
Figure 13:
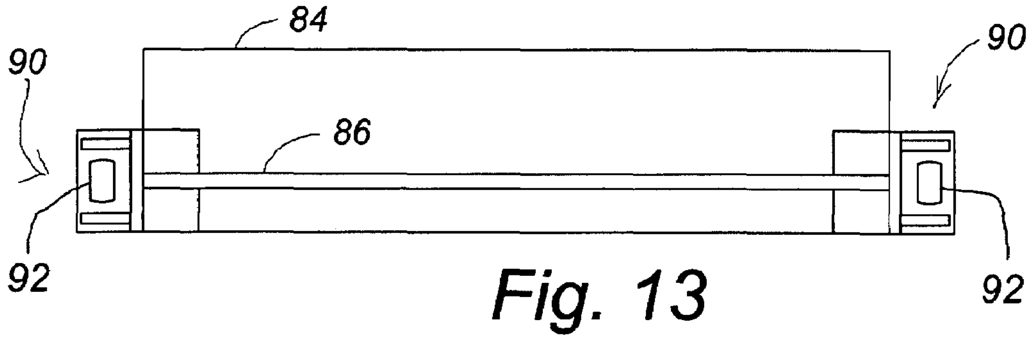
Figure 14:
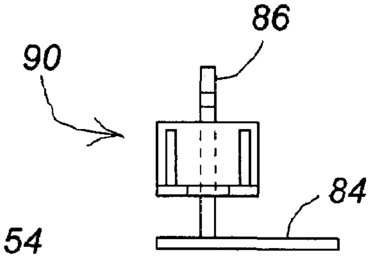

Turning to FIGS. 12–14, a bracket 82 is shown. The bracket 82 comprises a flat base plate 84 and a flat vertical member 86 welded to the base plate 84 and including five ports 88. The ports 88 are substantially rectangular and have rounded ends. Two of the ports 88 have their long axes oriented horizontally and are located to the left side of the vertical member (as shown in FIG. 12); two of the ports have their long axes oriented horizontally and are located to the right side of the vertical member 86, and one of the ports is located with its long axis oriented vertically in the middle of the vertical member 86. Two twist lock coupling members 90 are located one at each end of the bracket 82 and are affixed to the vertical member 86. Each twist lock coupling member 90 comprises a flat horizontal member 94 and two vertical members 96 which are substantially triangular in shape. Each twist lock coupling member 90 includes a port 92 which is substantially rectangular and has rounded ends. As shown in FIG. 12, the ports 92 are shaped and sized to accommodate twist locks 100. Moreover, as shown in FIG. 12, it can be understood that the bracket 82 is sized and shaped so that when twist locks 100 are coupled to the ports 92, the twist locks cooperate with the deck slot pedestals 60.

In FIG. 5 the location of the base plate 84 is shown. As part of the first type of mounting system 56 the base plate 84 is located as shown. As part of the second type of mounting system 58 the base plate 84 can be located to cooperate with either of two sets of deck slot pedestals 60, depending on the length of the tower section to be accommodated.

Figure 15:
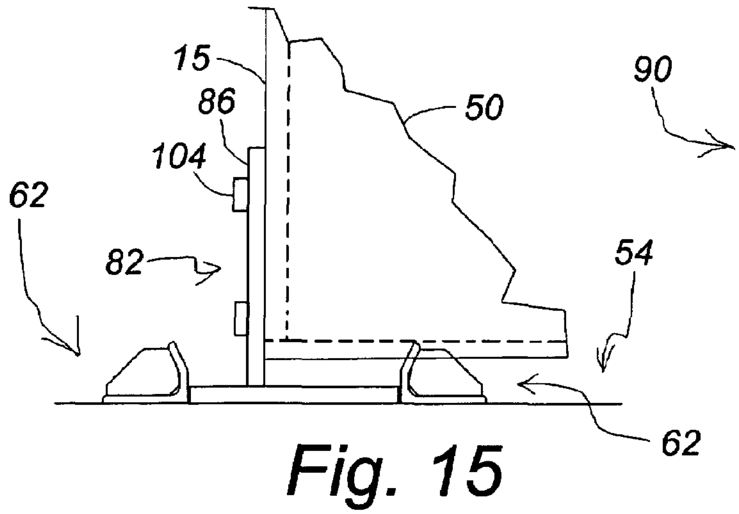
Figure 16:
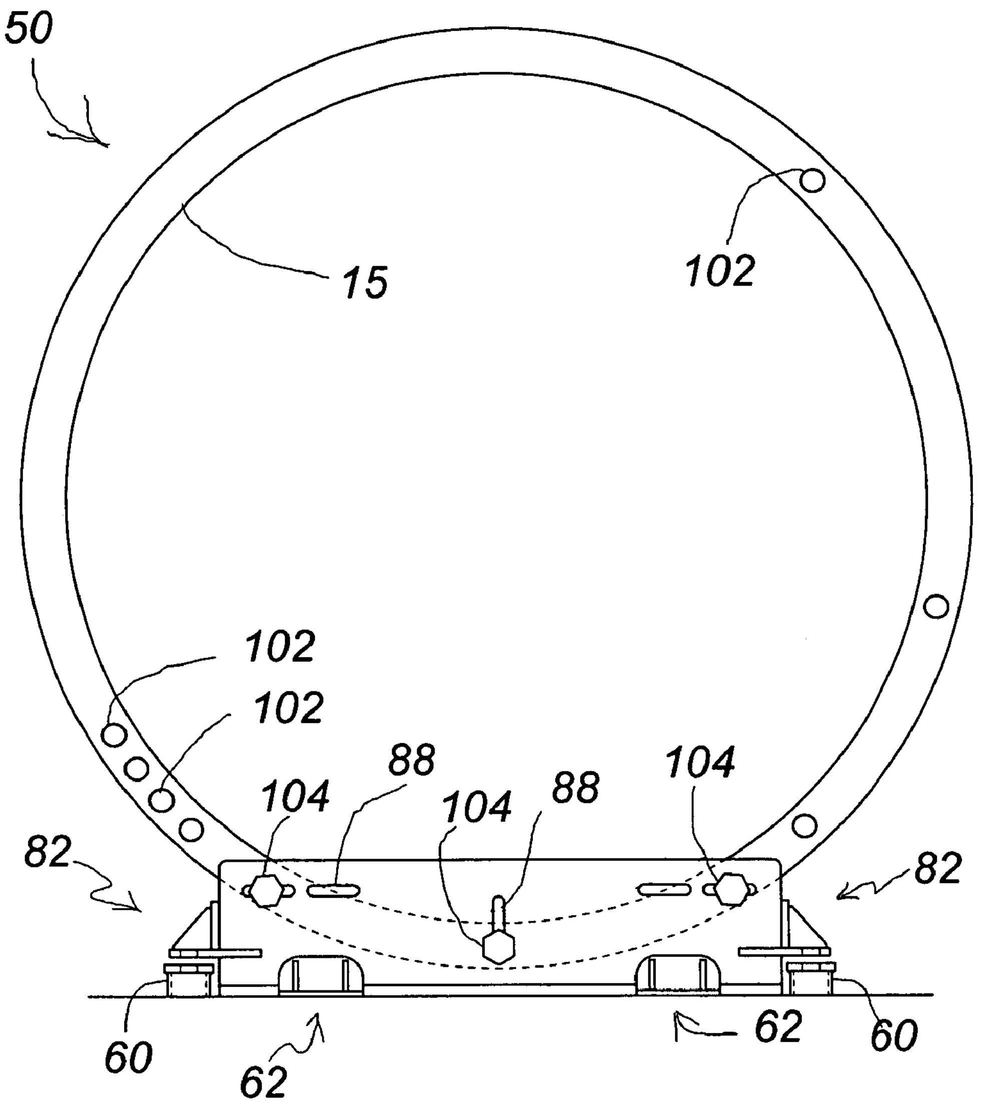
FIG. 16 shows an end view of a tower section mounted on a rail car.

FIG. 15 shows the first type of mounting system 56 in which the end stops 62 are welded to the deck of the rail car 54 and the bracket 82 is located between the end stops 62. It should be understood that in the second type of mounting system 58 there are no end stops 62. Turning to FIG. 16 the bracket 82 is shown connected to a tower section 16. It should be understood that each tower section 50 and 52 has a disc shaped flange 15 at each of its ends, and each flange 15 has a plurality of holes 102 located around its circumference so that tower sections can be bolted together. In the present transportation system the top tower section 50 is connected to the bracket 82 by three bolts 104. There are no bolts through two of the ports 88 because the two ports are not used with tower section 50 but are used to accommodate top tower sections 52 which have a smaller diameter.

Turning now to FIGS. 19–25 the system for transporting blades 14 is illustrated. The system comprises four cargo containers, a first large cargo container 122, a second large cargo container 123, a first small cargo container 124 and a second small cargo container 126 connected end to end with each other. Two blades 14 are packed inside the four cargo containers.

The right end of the first small cargo container 124 and the left end of the first large cargo container 122 are mounted to the rail car 54 by a pedestal system 200, and the right end of the second large cargo container 123 and the left end of the second small cargo container 126 are mounted to the rail car 54 by a second pedestal system 200.

Figure 21:
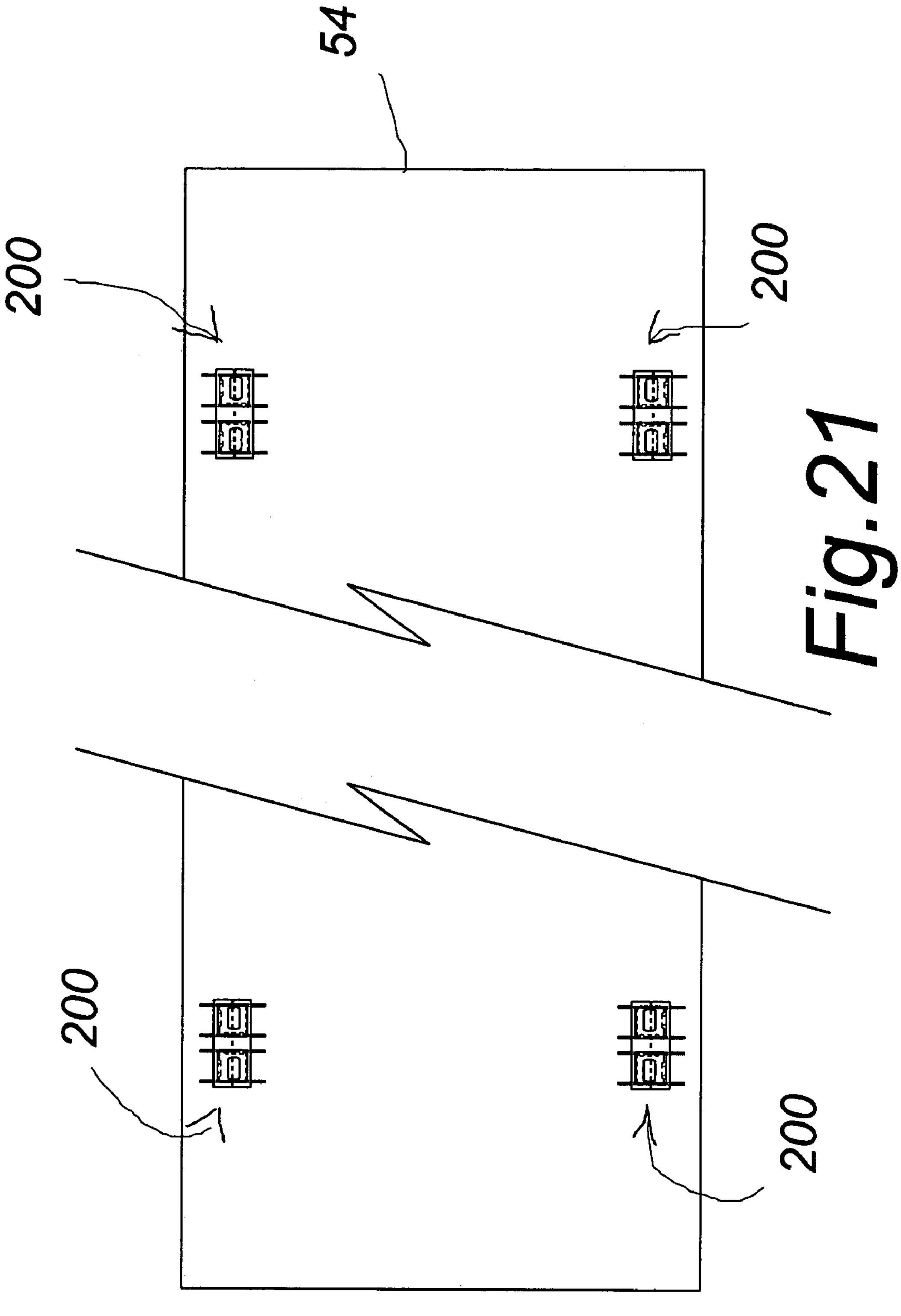
FIG. 21 shows a plan view of part of the system of FIG. 19.
Figure 22:
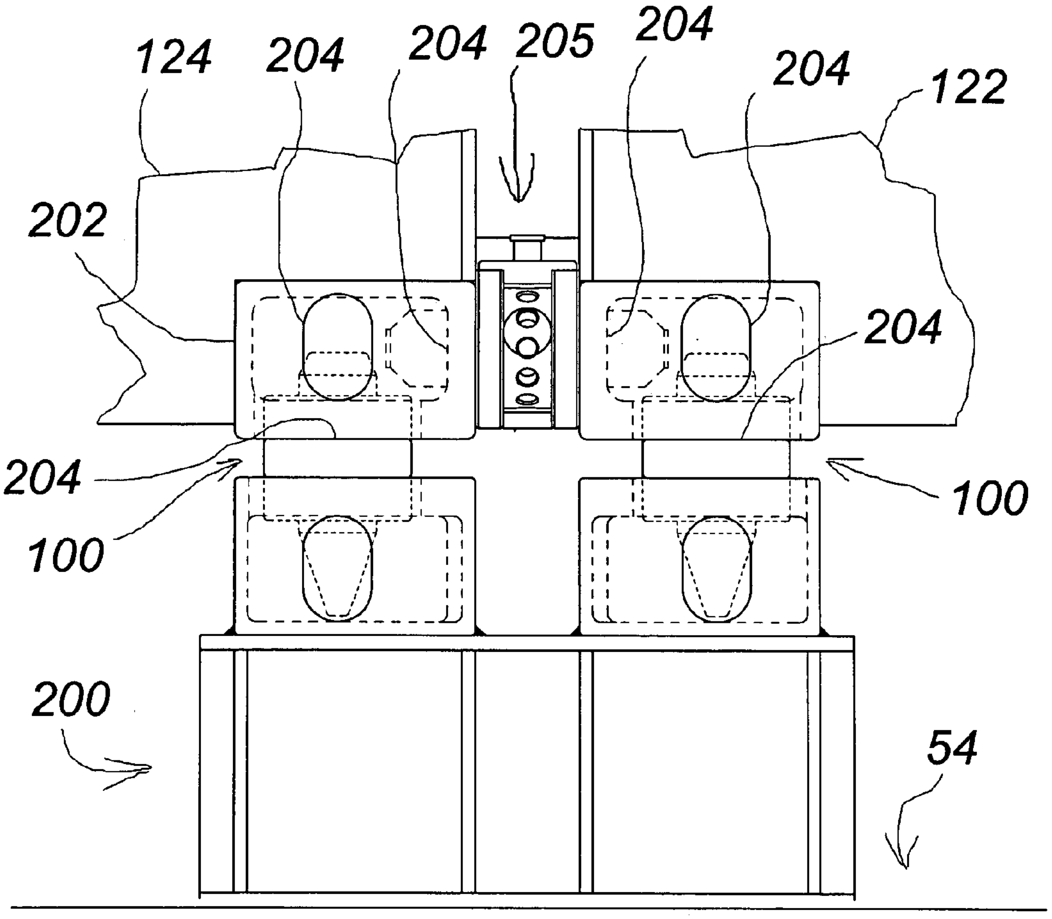
FIGS. 22–25 show details of the system of FIG. 19.

As best illustrated in FIG. 21 four pedestal systems 200 are welded to the deck of the rail car 54 near each corner of the deck. With reference to FIG. 22, the coupling of the pedestal system to the cargo containers is shown. It should be understood that this figure illustrates the coupling of one corner of the right end of the first small cargo container 124 and the left end of the first large cargo container 122, and the three other coupling systems are the same as the one illustrated. A standard corner member 202 is connected to each corner of the cargo containers 122 and 124. Each corner member includes three ports 204, only one of which is visible in this figure, it being understood that the other ports are substantially identical to those which are shown. The ports 204 are located so that they are aligned with the faces of the cargo containers, and the ports are of industry standard configuration to cooperate with standard twist locks 100. A conventional twist tie 205 connects the two corner members 202.

Figure 23:
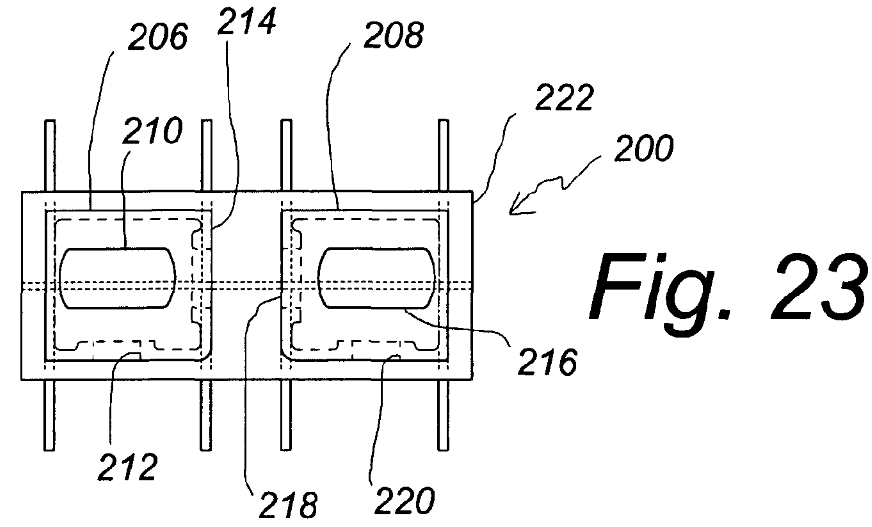
Figure 24:
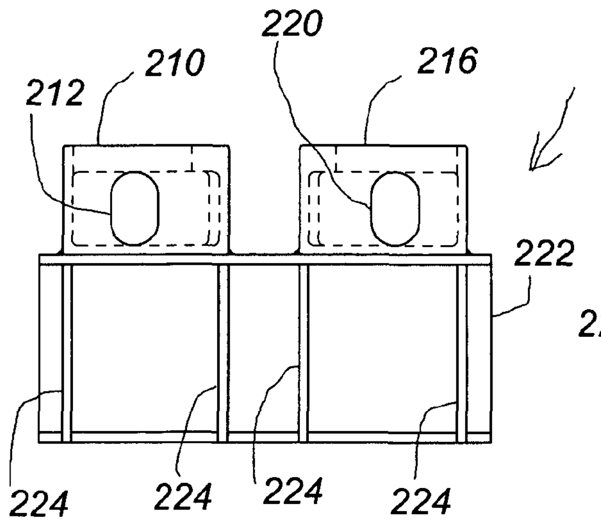
Figure 25:
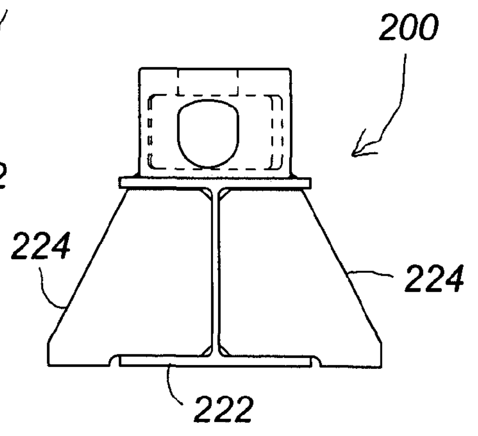

With reference to FIGS. 23–25 the pedestal system 200 comprises two connector boxes 206 and 208 which are substantially cube shaped and include ports. Connector box 206 includes three ports 210, 212 and 214, and connector box 208 includes three ports 216, 218 and 220. The connector boxes 206 and 208 are identical to standard corner members 202 so that standard twist locks are compatible with the connector boxes 206 and 208. The connector boxes 206 and 208 are welded to the top of an I beam 222, and eight reinforcing members 224 are welded to the I beam 222.

Figure 19:
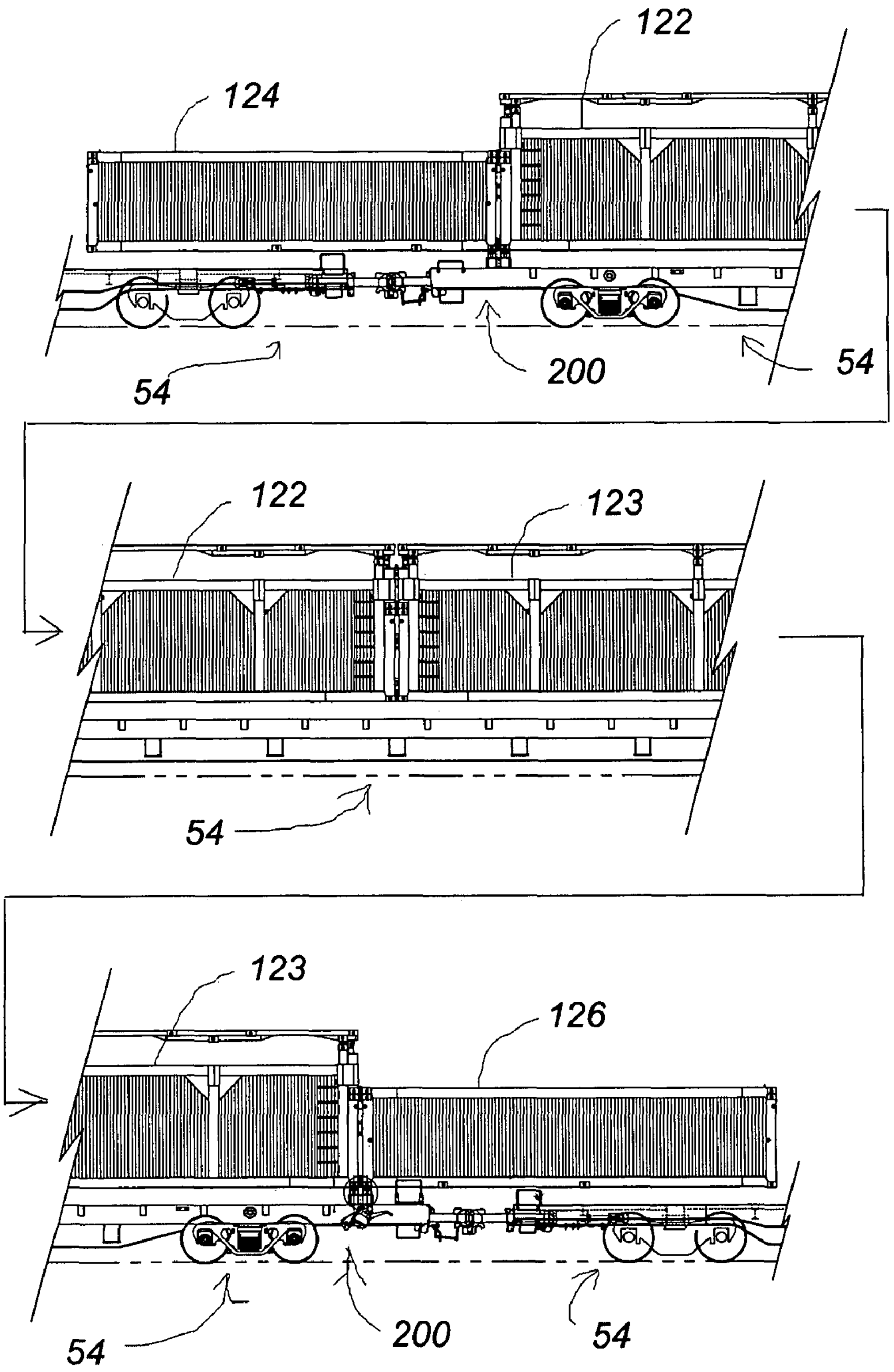
FIG. 19 shows a preferred embodiment for transporting blades, broken into three sections.
Figure 19A:
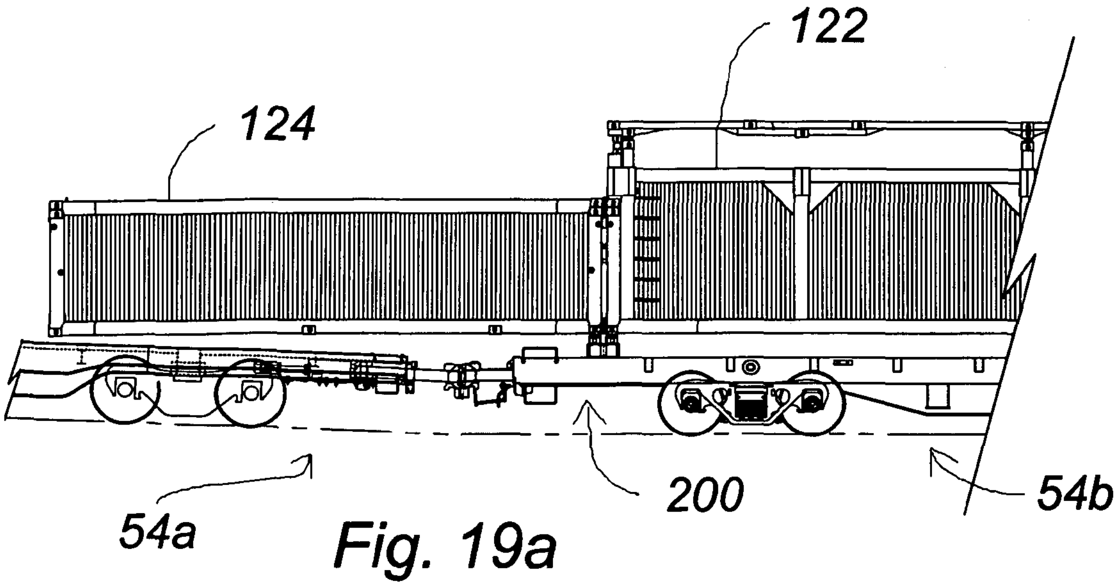
FIG. 19*a* shows the embodiment of FIG. 19 in operation.
Figure 20:
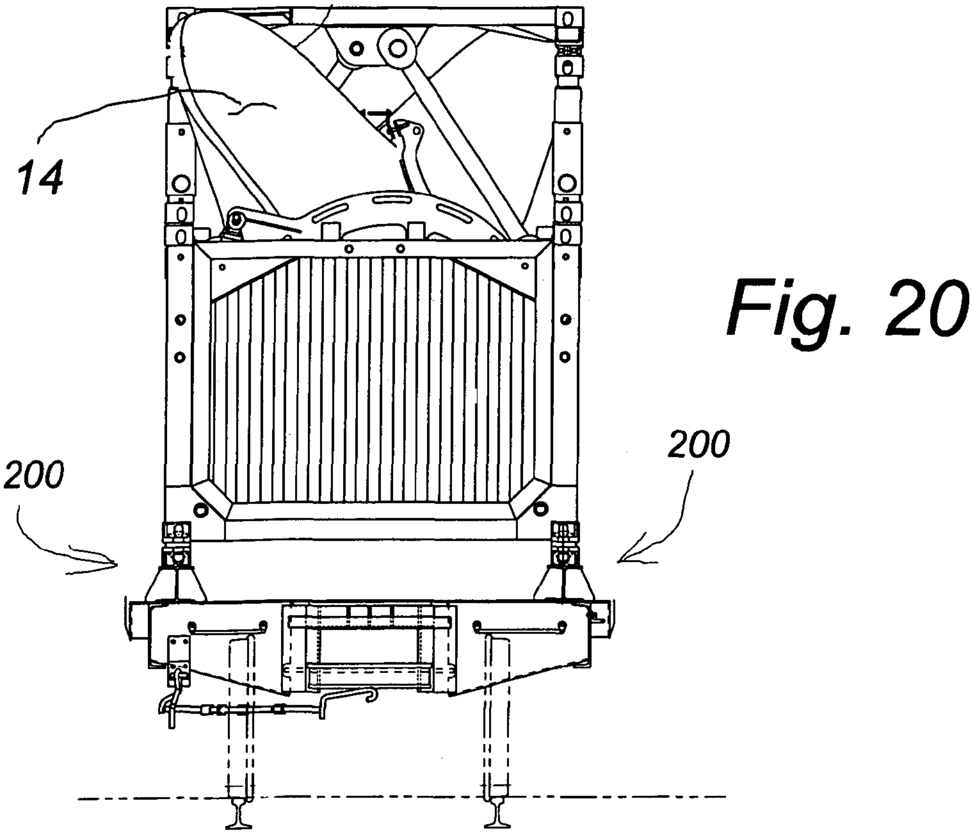
FIG. 20 shows an end view of the embodiment of FIG. 19.

One of the advantages of the preferred embodiment can now be appreciated with reference to FIG. 19*a*. It should be noted that railroad cars must be able to travel over uneven terrain and sometimes a car, in this example car 54*a*, will be higher than an adjacent car, in this case car 54*b*. This can result in the car 54*a* being in relatively close vertical proximity to first small cargo container 124. The pedestal system 200 is designed to insure that the car 54*a* does not contact the small cargo container 124. Similarly, when the cars travel around a turn the car 54*a* will not be aligned with car 54*b*. If the left end of the first small cargo container 124 were attached to car 54*a* it would be difficult, if not impossible for the cars to make the turn. However, with the present system, this potential problem has been solved.

Figure 1:
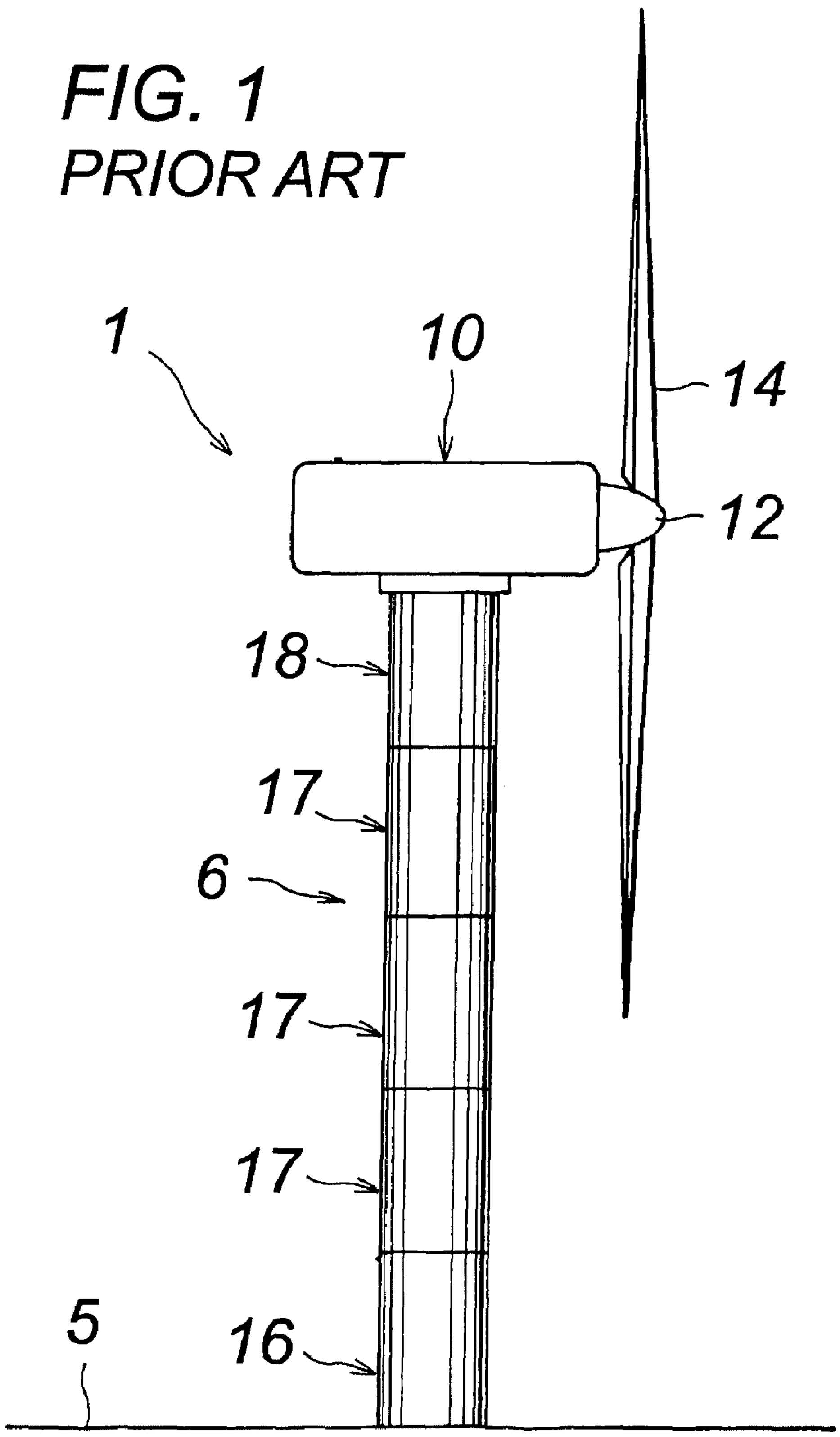
FIG. 1 shows a conventional wind turbine.
Figure 2:
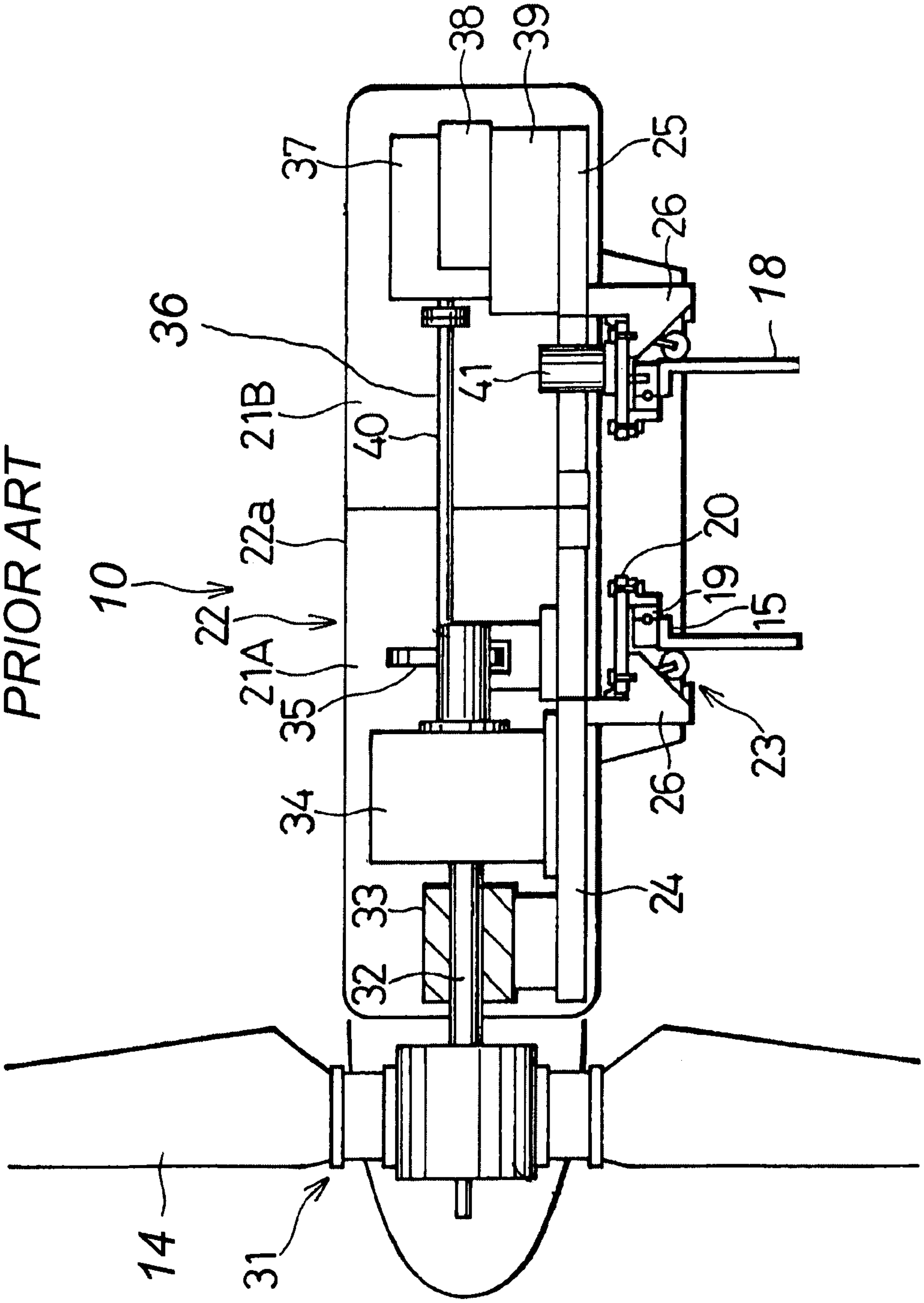
FIG. 2 shows the interior of the nacelle of a conventional wind turbine.
Figure 26:
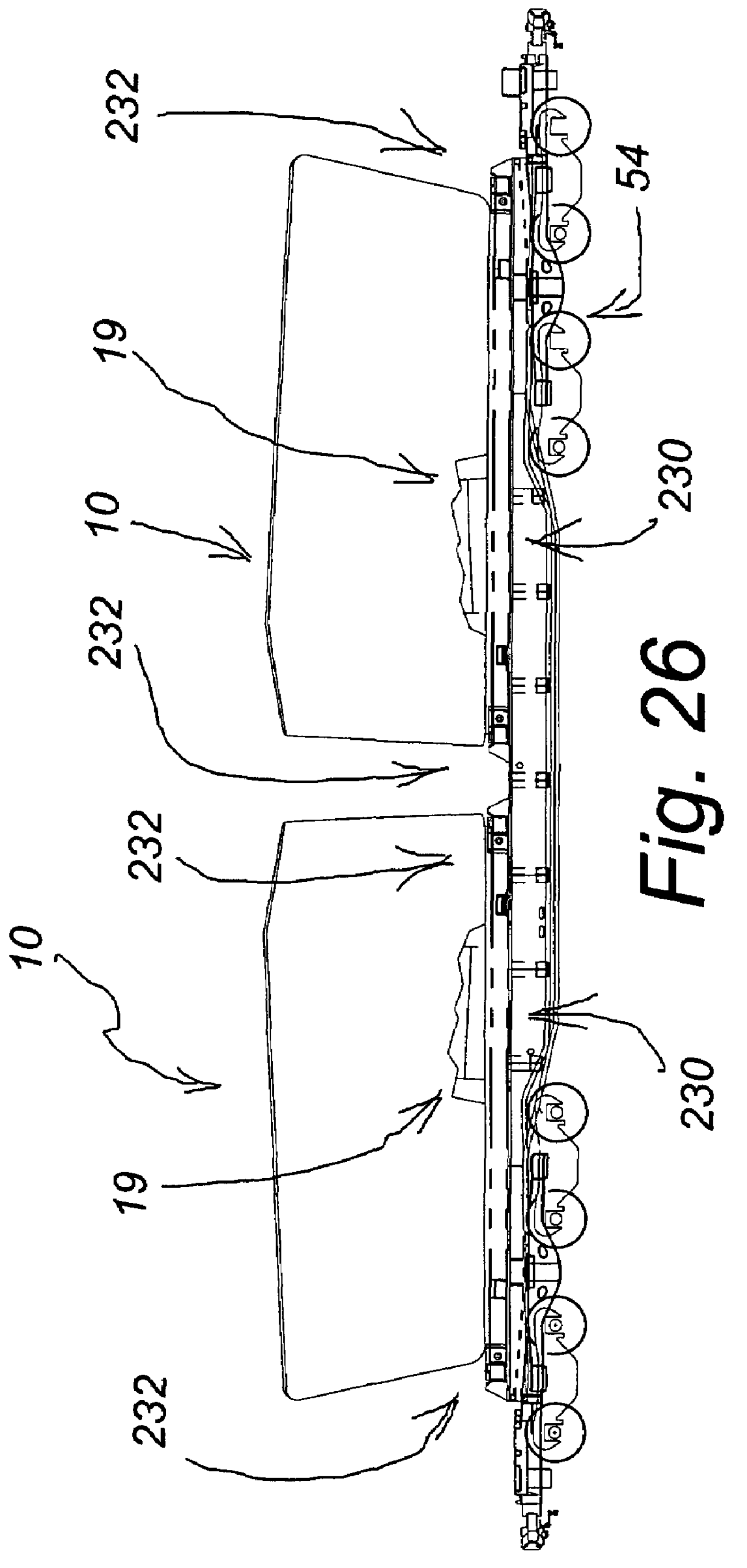
FIG. 26 shows a preferred embodiment for transporting nacelles.
Figure 27:
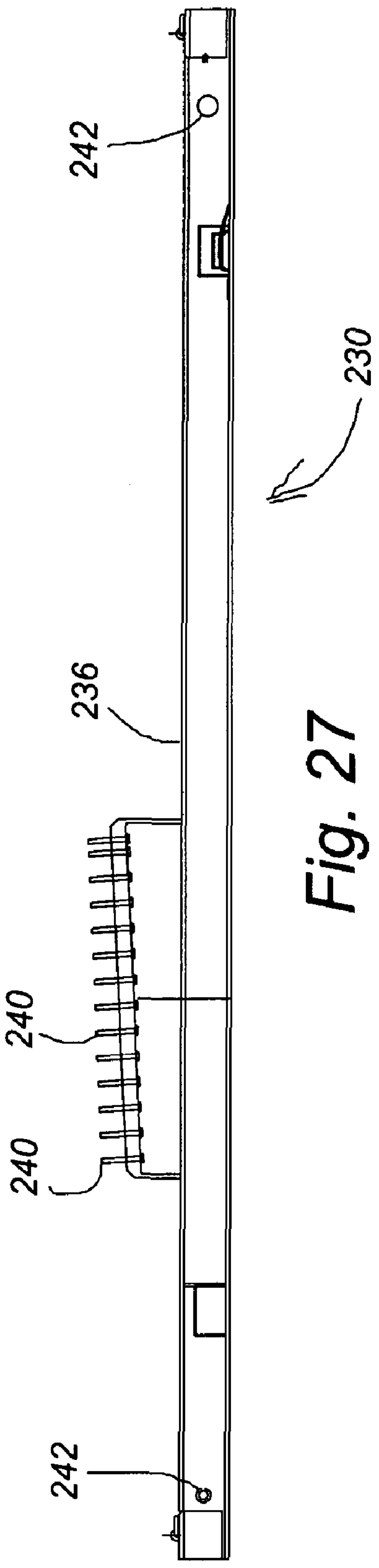
FIGS. 27–32 show details of the system of FIG. 26.
Figure 28:
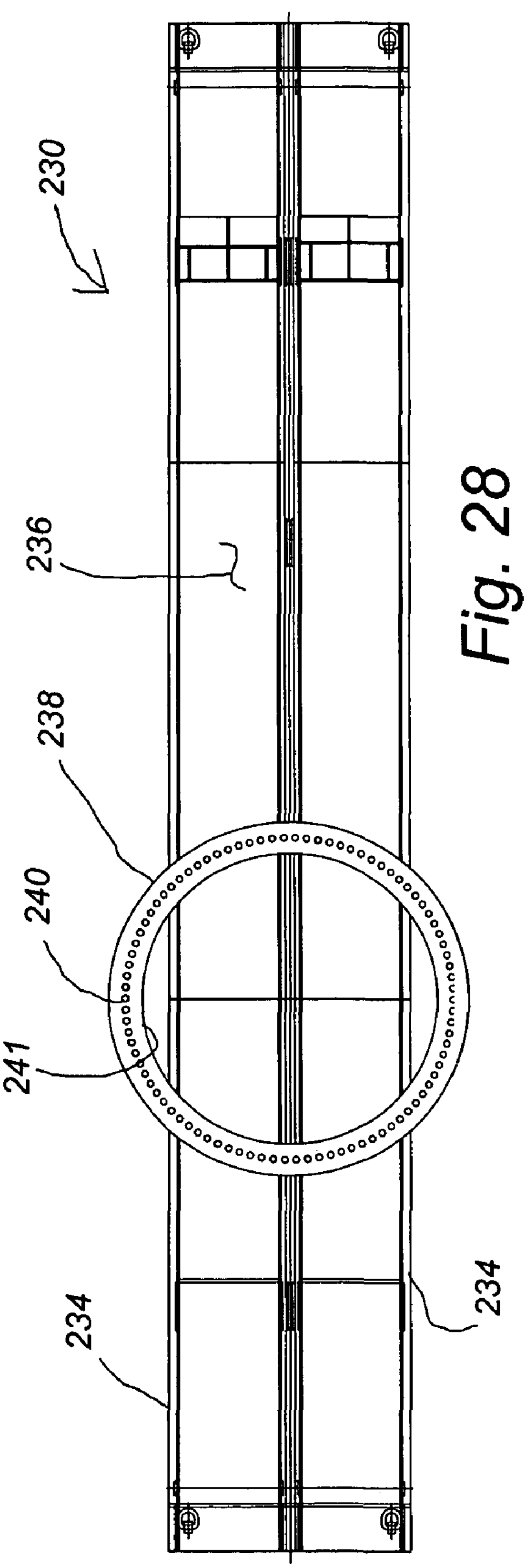

FIGS. 26–32 show the transport system for nacelles. In FIG. 26 two nacelles 10 are shown mounted on rail car 54 by a transport frame 230 and nacelle stops 232. The nacelles 10 contain components such as those illustrated in FIG. 2, including a bearing 19 to which the transport frame 230 is bolted. FIGS. 27 and 28 show the transport frame 230, which includes two beams 234 and a plate 236 affixed to the tops of the beams 234. A cylindrical member 238 is affixed to the top of the plate, and a plurality of bolts 240 are connected through a flange 241 the top of the cylindrical member 238 so that the bolts can be bolted to the bearing 19 of the nacelle. Four cylindrical holes 242 are formed, one in each end of each beam 234 to accommodate two rods 243.

Figures 29, 30, 31, 32:
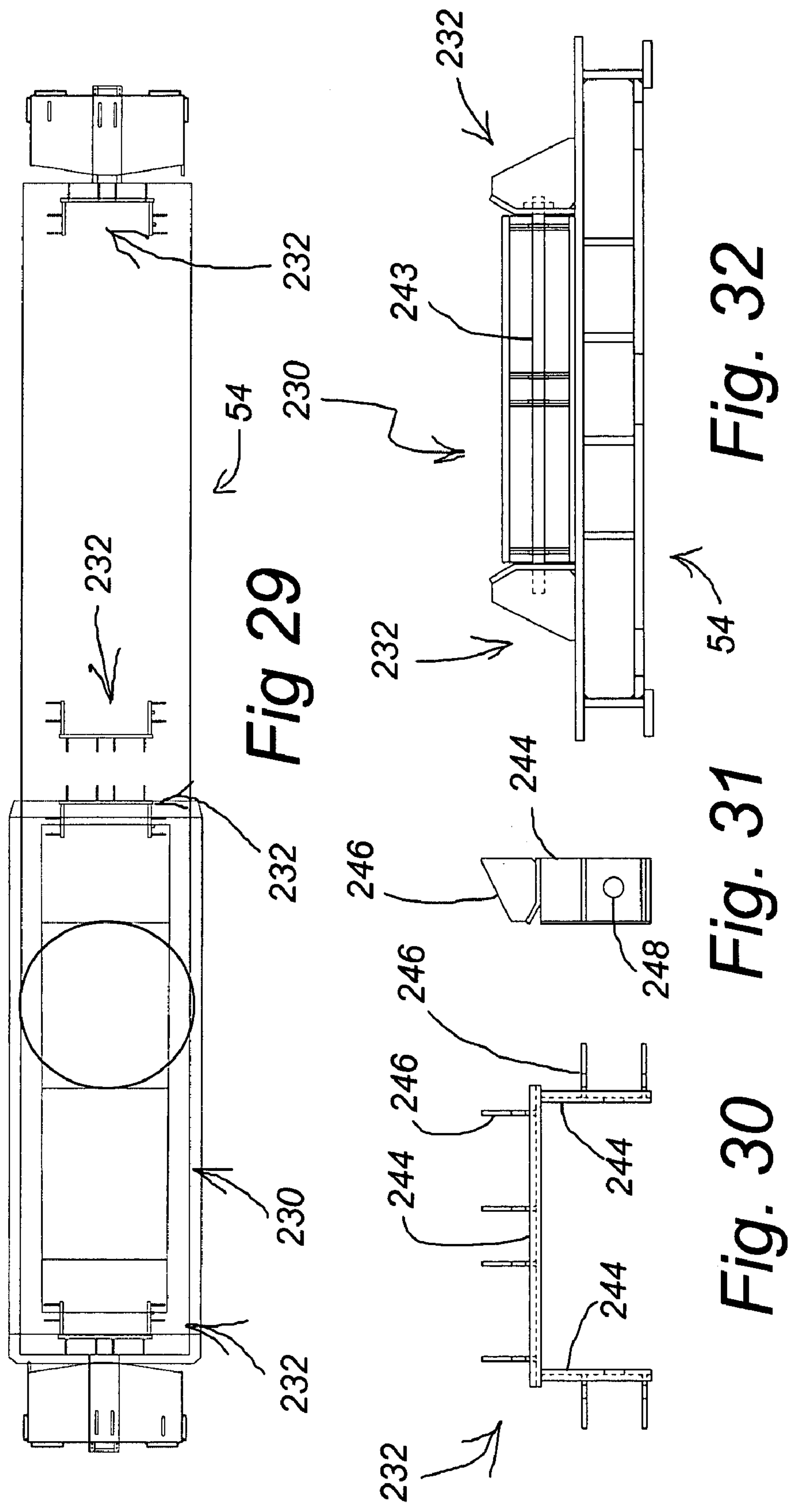

FIG. 29 shows the rail car 54 with nacelle stops 232, two of which are attached near the ends of the rail car and two of which are attached near the middle thereof. FIGS. 30 and 31 show a nacelle stop 232, which includes three plates members 244 and eight support members 246. Two of the plate members 244 include cylindrical holes 248 which are sized and located to align with the holes 242 on the transport frame 230. As shown in FIG. 32, the transport frame 230 is connected to the nacelle stops 232 by a rod 243 inserted through holes 242 and 248 when the transport frame 230 and the nacelle stop 232 are aligned with each other.

Turning now to FIGS. 33–46 another embodiment of the present invention is shown. In this embodiment a system is provided to configure a rail car to be capable of carrying tower sections of a variety of sizes or to carry blades in cargo containers.

Figure 33:
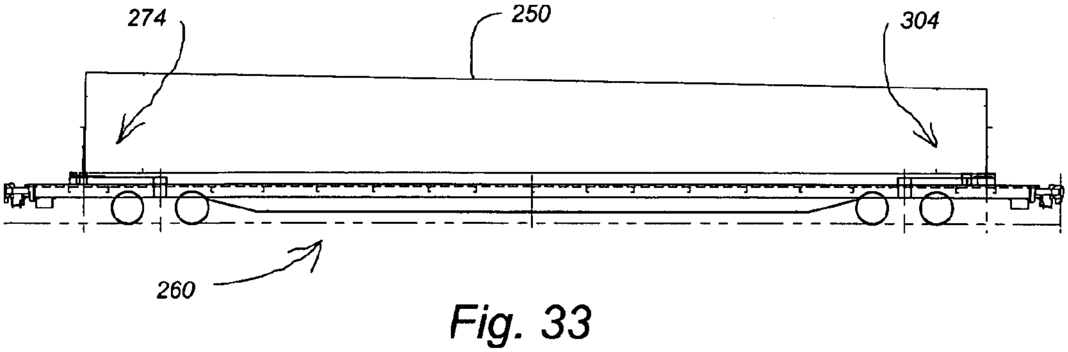
FIGS. 33–37 show elevation views of railroad cars with tower sections in accordance with another embodiment of the present invention.
Figure 34:
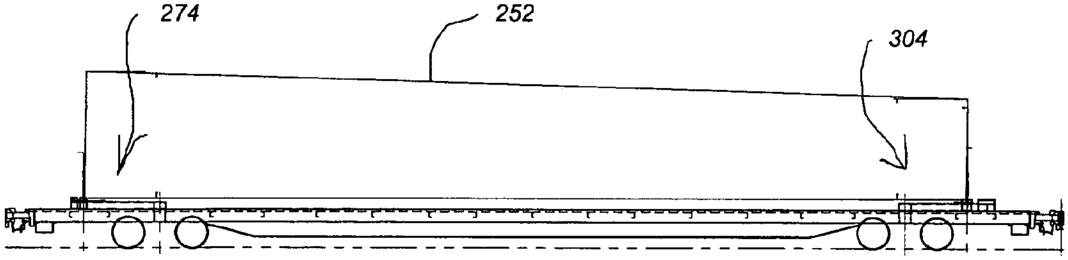
Figure 35:
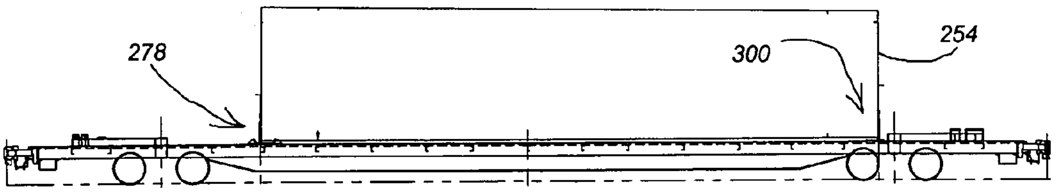
Figure 36:
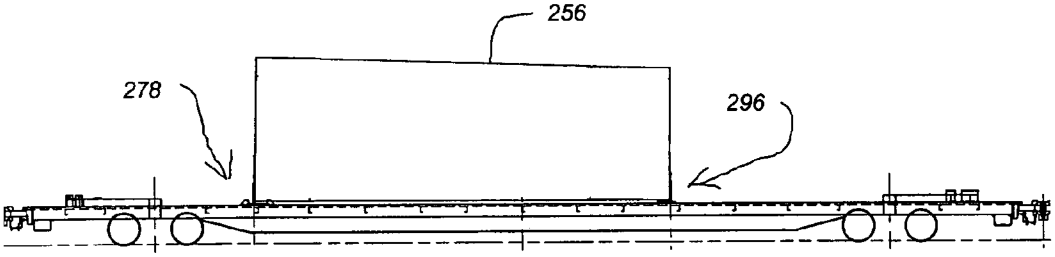
Figure 37:
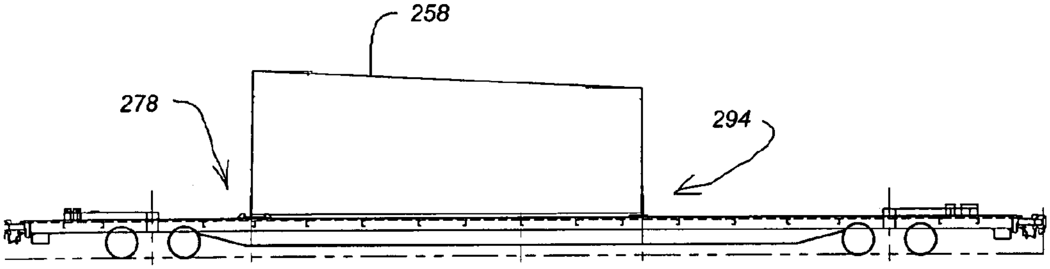

As discussed above, tower sections can be a variety of sizes. It is desirable to configure a rail car so that it is capable of carrying a tower section of any one of the sizes. In the particular embodiment discussed herein the tower sections have particular sizes for the purposes of this example, and it should be understood that the invention is equally applicable to tower sections of sizes different from those discussed herein. FIG. 33 shows the mounting system for a top tower section 250, which is the longest section. FIG. 34 shows the mounting system for a middle tower section 252, which is shorter than the top section 250. FIG. 35 shows the upper base section 254, which is shorter than the middle section 252. FIG. 36 shows the lower base section 256, which is shorter than the upper base section 254. FIG. 37 shows the middle base section 258, which is shorter than the lower base section 256. In FIGS. 33–37 the rail car 260 is configured in the same way, as will be described with reference to FIG. 38.

Figure 38:
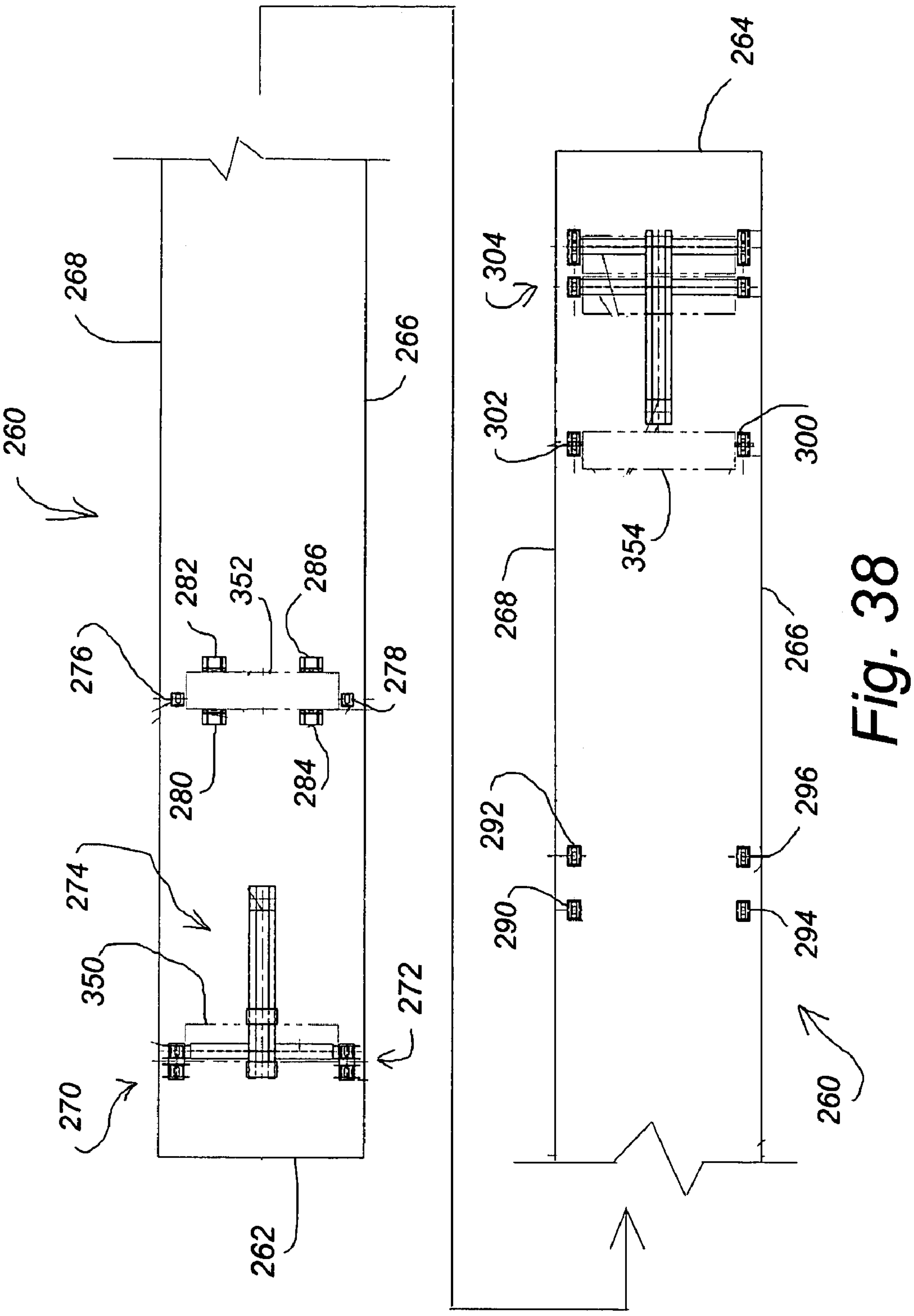
FIG. 38 shows a plan view of the deck of a railroad car configured according to the embodiment shown in FIGS. 33–37.
Figure 41:
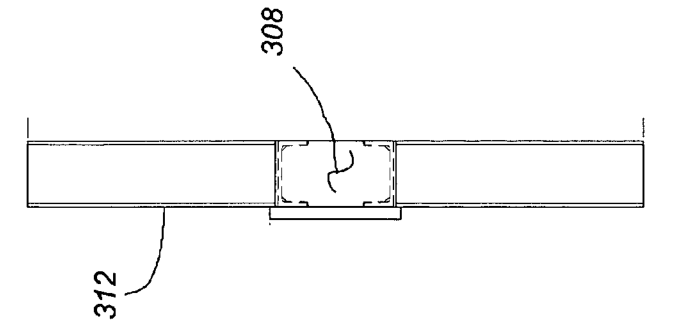
FIGS. 39–44 show details of the embodiment shown in FIGS. 33–38.
Figure 39:
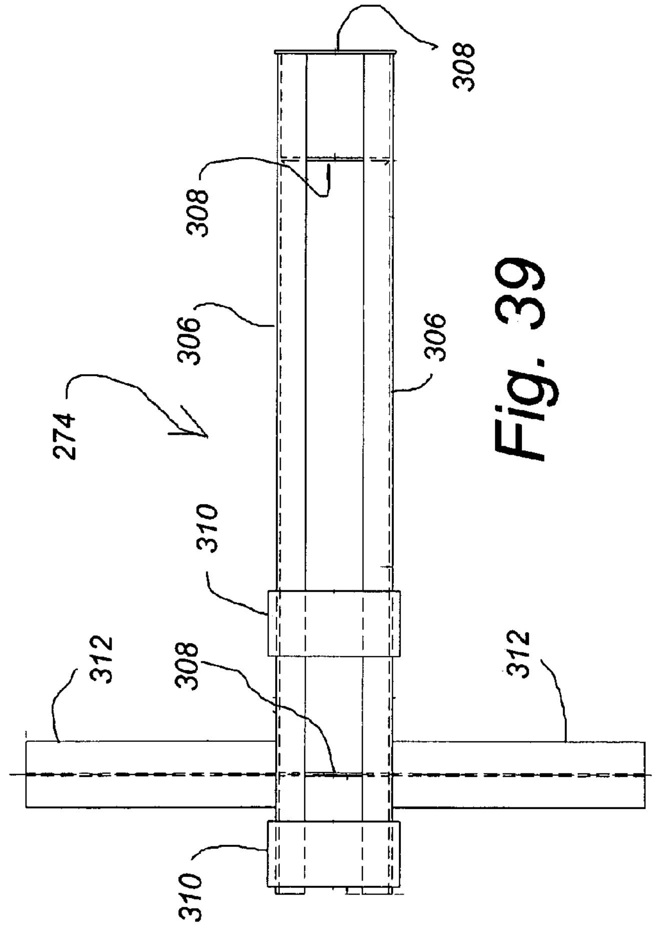
Figure 40:
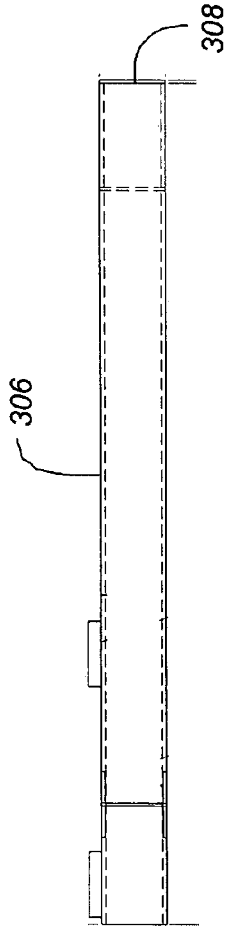
Figure 44:
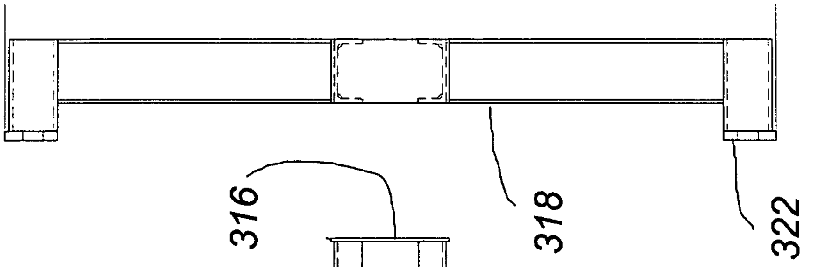
Figure 42:
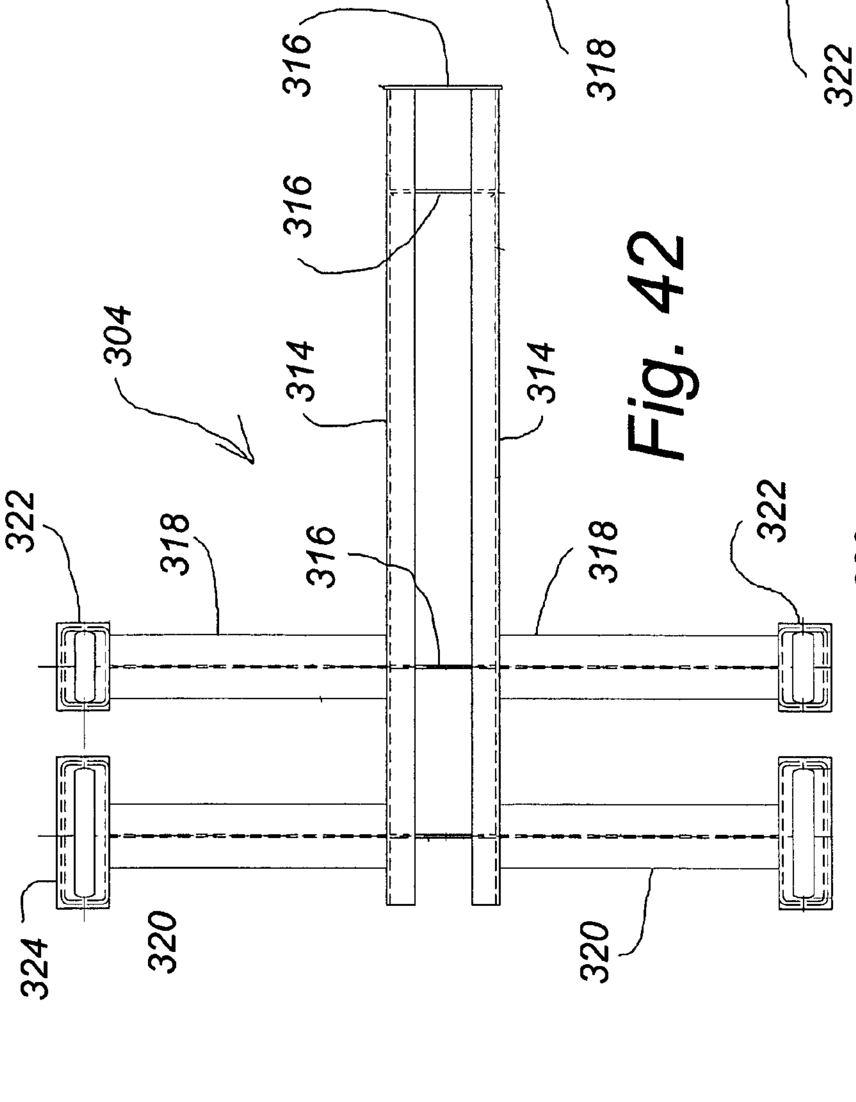
Figure 43:
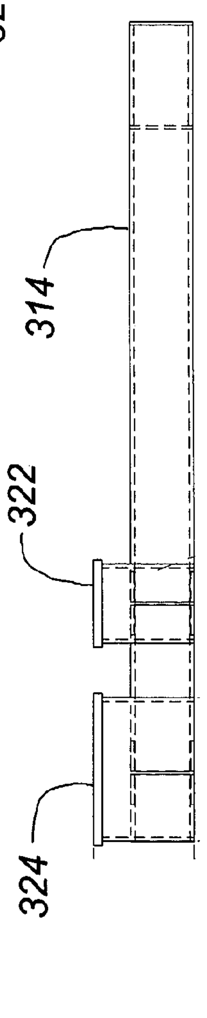

FIG. 38 shows the deck of the rail car 260 in plan view, and, for reference purposes, the rail car will be said to have a left end 262, a right end 264, a front side 266 and a back side 268. A first pedestal system 270 is welded to the deck of the rail car 260 near the back, left corner, and a second pedestal system 272 is welded to the deck near the front, left corner. The pedestal systems 270 and 272 are the same in configuration as pedestal systems 200 discussed above. Between the pedestal systems 270 and 272, a fixed riser assembly 274 is welded to the deck. The riser assembly 274 is described below. To the right of the fixed riser assembly 274 a first deck slot pedestal 276 is located near the back side of the deck, and a second deck slot pedestal 278 is located near the front of the deck. The deck slot pedestals 276 and 278 are the same configuration as short deck slot pedestals 59, discussed above. Between the deck slot pedestals 276 and 278 four end stops 280, 282, 284 and 286 are welded to the deck. The end stops 280–286 are the same in configuration as the end stops 62 discussed above.

To the right of deck slot pedestals 276, 278 four deck slot pedestals are mounted to the deck, two of which, 290 and 292 are mounted near the back and two of which, 294 and 296 are mounted near the front. Deck slot pedestals 290–296 are similar in construction to deck slot pedestals 60 discussed above. To the right of deck slot pedestals 290–296, two deck slot pedestals 300 and 302 are mounted near the front and the back of the rail car respectively. To the right of the deck slot pedestals 300 and 302 a floating riser system 304 is welded to the deck of the car 260, near the right end.

The fixed riser system 274 and the floating riser system 304 are shown in FIGS. 39–41 and 42–44, respectively. The fixed riser system 274 comprises two steel beams 306 having C-shaped cross sections and located parallel to each other and connected to each other by three plates 308. Two plates 310 are welded to the tops of the beams 306, and two I-beams 312 are welded, one to each of the beams 306 to form a substantially cross-shaped structure. The floating riser system 304 comprises two steel beams 314 having C-shaped cross sections and located parallel to each other and connected to each other by four plates 316. Two I-beams 318 are welded, one to each of the beams 314, and two I beams 320 are welded, one to each of the beams 314. At the ends of the I beams 318 are affixed deck slot pedestals 322 and at the ends of the I beams 320 are affixed deck slot pedestals 324. The deck slot pedestals 322 are the same as deck slot pedestals 60, and pedestals 324 are similar in construction to deck slot pedestals 60, except that the deck slot pedestals 324 are longer than the pedestals 322.

Figure 45:
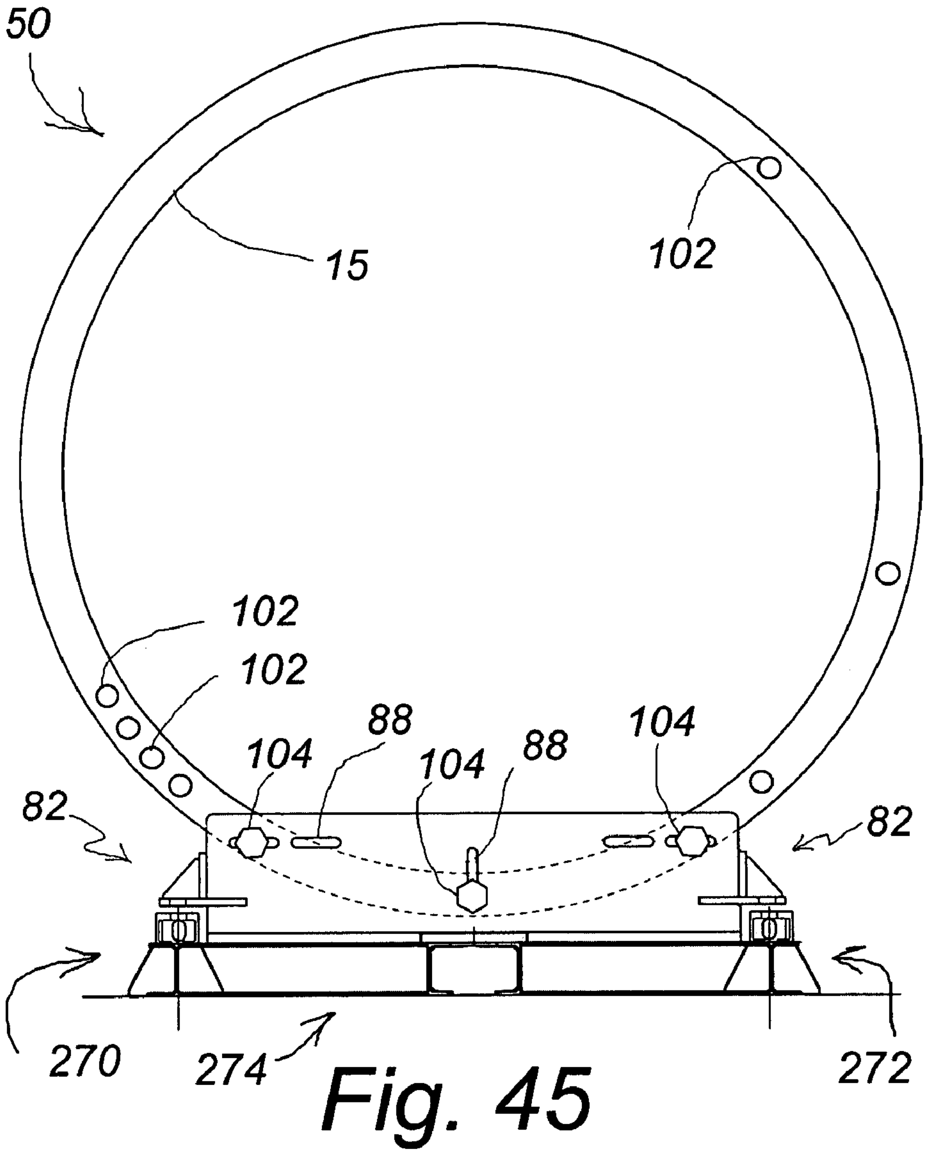
FIG. 45 shows an end view of a tower section.

Turning now to FIG. 45, the system for mounting a tower section to the rail car is shown. The system shown in FIG. 45 is similar to that shown in FIG. 16. However, in FIG. 45 the fixed end riser 274 is included and no end stops 62 are included. It should be understood that the system for mounting a tower section to a floating end riser 340 is substantially the same as the system shown in FIG. 45.

Turning again to FIGS. 33–37 the system for mounting the towers can now be appreciated. FIG. 33 shows the top tower section 250, which is the longest section, with its left end coupled to the first and second pedestal systems 270 and 272 by twist locks. The base plate 84 sits atop the fixed riser 274, and the base plate 84 is located between the two plates 310 in the position indicated by dashed lines 350 (FIG. 38) so that the plates 310 prevent motion of the tower in the direction extending between the left and right ends of the rail car. The right end of tower section 250 is coupled to the deck slot pedestals 324 of the floating riser system 304 by twist locks. It should be noted that the long slots in the deck slot pedestals 324 allow for variations in tower length. It should also be understood that conventional rail cars are often made with a deck which is not flat but which is slightly higher in the middle than at its left and right ends so that when loads are mounted on the car, slight sagging in the middle results in a relatively flat car. As cars age the extent of the height differential between the middle and the ends normally decreases. Accordingly it can be seen that the present mounting system which raises the ends of the tower section, thus permits the tower to be carried securely on conventional, slightly bowed rail cars.

FIG. 34 shows the middle tower section 252, which is shorter than the top section 250, mounted similarly to the top section 250 except that the right end of the tower section 252 is coupled to the deck slot pedestals 322 of the floating riser system 304.

FIG. 35 shows the upper base section 254, which is shorter than the middle section 252, with its left end mounted to deck slot pedestals 276 and 278 as indicated by dashed lines 352 (FIG. 38) and its right end mounted to deck slot pedestals 300 and 302 as indicated by dashed lines 354.

FIG. 36 shows the lower base section 256, which is shorter than the upper base section 254, with its left end mounted to deck slot pedestals 276 and 278 as indicated by dashed lines 352 (FIG. 38) and its right end mounted to deck slot pedestals 292 and 296.

FIG. 37 shows the middle base section 258, which is shorter than the lower base section 256, with its left end mounted to deck slot pedestals 276 and 278 as indicated by dashed lines 352 (FIG. 38) and its right end mounted to deck slot pedestals 290 and 294.

Figure 46:
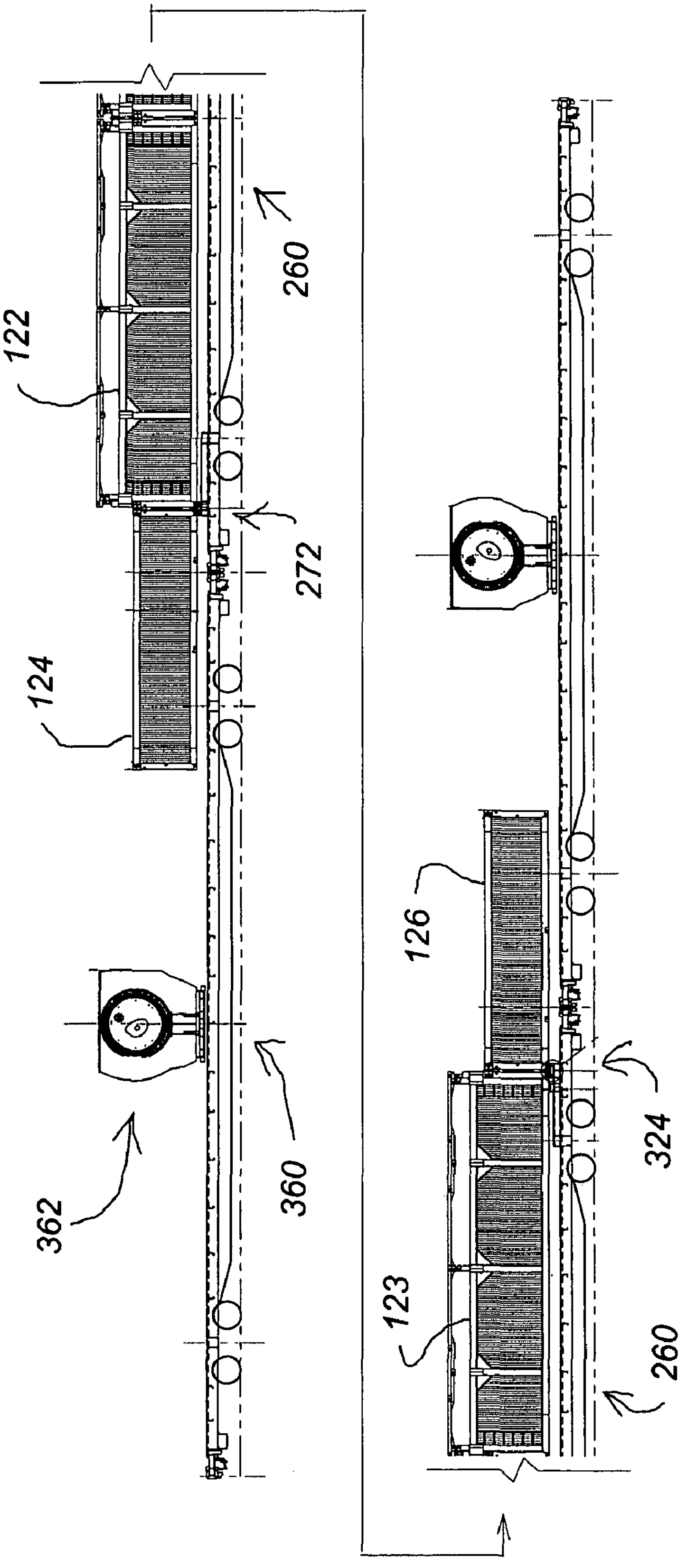
FIG. 46 shows an elevation view of railroad cars in accordance with the embodiment shown in FIGS. 33–38.

Turning now to FIG. 46 a system for mounting blades in cargo containers to a rail car and for mounting rotor hubs to adjacent rail cars is shown. The blades are packed in cargo containers 122, 123, 124 and 126 as discussed above. The cargo containers are mounted to the rail car 260 by coupling the right end of the first small cargo container 124 and the left end of the first large cargo container 122 to the first and second pedestal systems 270 and 272 by twist ties. The left end of the second small cargo container 126 and the right end of the second large cargo container 123 are coupled to the deck slot pedestals 324 of the floating riser system 304 by twist ties.

Figure 47:
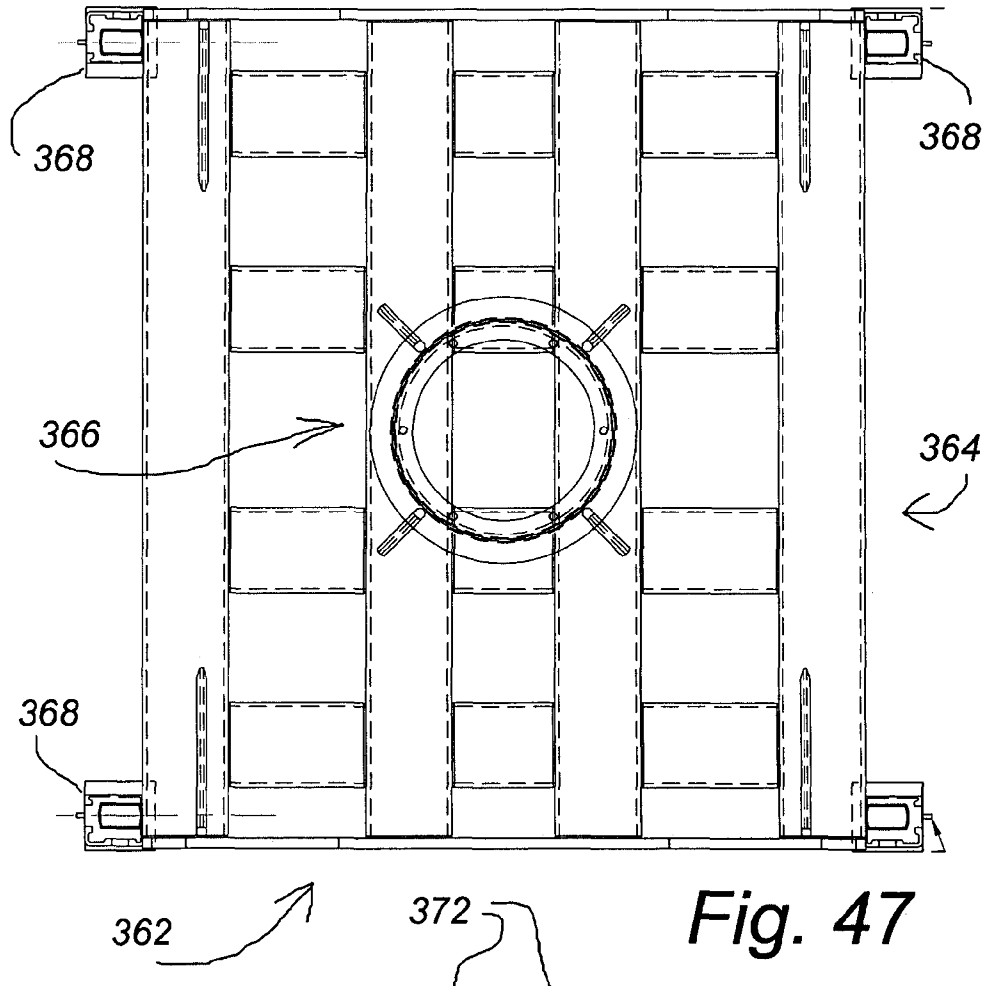
FIG. 47 shows a plan view of a system for transporting rotor hubs.
Figure 48:
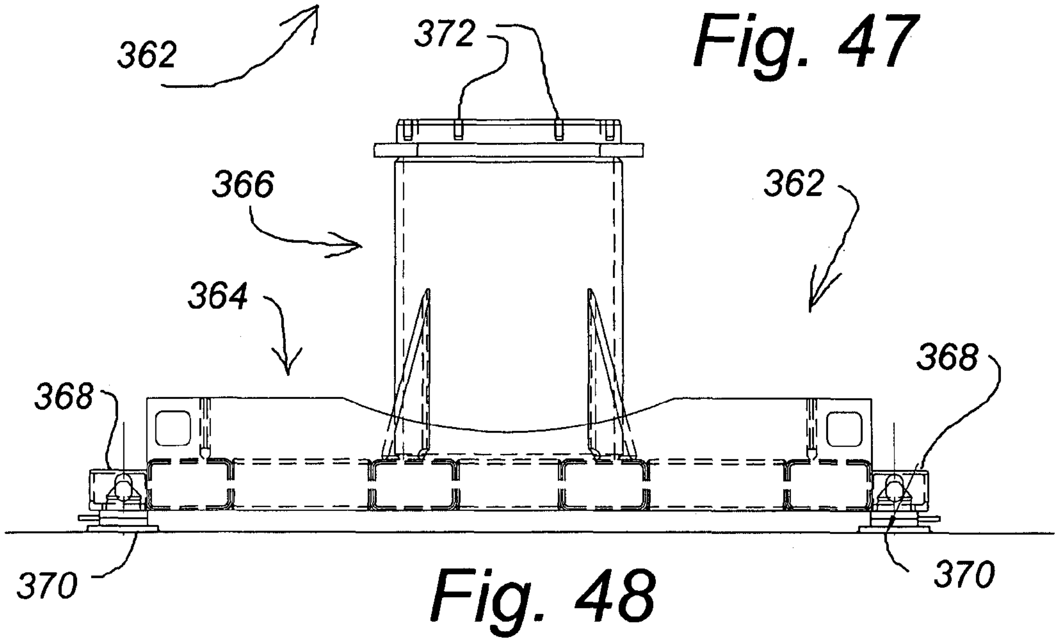
FIG. 48 shows an elevation view of the device of FIG. 47.

To the left and right of rail car 260 are connected other rail cars 360 on which are mounted rotor hubs 31. Turning to FIGS. 47 and 48 the system for mounting rotor hubs 31 is shown. The rotor mounting system 362 comprises a relatively flat deck section 364 to which is connected a cylindrical section 366. At each corner of the deck section 364 is connected a twist tie connector 368 which includes a slot configured to cooperate with a standard twist tie. Standard twist ties 370 which have flat bases are welded to the deck of the rail car 360 to cooperate with the twist tie connectors 368. A plurality of bolt holes 372 are formed in the top of the cylindrical section 366 so that a rotor hub 31 can be bolted to the rotor hub mounting system 362.

While the invention has been described in detail with reference to preferred embodiments thereof, it will be apparent to one skilled in the art that various changes can be made, and equivalents employed, without departing from the scope of the invention. All of the aforementioned documents are incorporated by reference in each of their entireties herein.

What is claimed is:

1. A system for transporting a first wind turbine tower section having a first length and a second wind turbine section having a second length, the system comprising:

a) a movable transportation device having a first end, a middle section, a second end, and a deck;

b) first pedestal means affixed to the deck of the first end of said movable transportation device, said first pedestal means comprising a plurality of deck slot pedestals and a plurality of end stops;

c) second pedestal means affixed to the deck of the middle section of said movable transportation device;

d) third pedestal means affixed to the deck of the second end of said movable transportation device;

e) first bracket means connected to each end of the first tower section;

f) second bracket means connected to each end of the second tower section; and, g) locking means to releasably engage said bracket means, said first pedestal means and said second pedestal means.

2. A system according to claim 1 wherein said first bracket means comprises a first bracket connected to the first end of the first tower section and a second bracket connected to the second end of the first tower section; and said second bracket means comprises a third bracket connected to the first end of the second tower section; and, a fourth bracket connected to the second end of the second tower section.

3. A system according to claim 2 wherein said first pedestal means is spaced apart from said second pedestal means a distance so that when said first bracket is connected to said first pedestal means, said second bracket is located to cooperate with said second pedestal means.

4. A system according to claim 2 wherein said first pedestal means is spaced apart from said second pedestal means a distance so that when said third bracket is connected to said first pedestal means, said fourth bracket is located to cooperate with said third pedestal means.

5. A system according to claim 1 wherein said first pedestal means and said third pedestal means are constructed and arranged to cooperate with twist lock connectors.

6. A system according to claim 5 wherein said first pedestal means and said third pedestal means are spaced apart from each other a distance sufficient so that two cargo containers can be coupled to each other and located between said first pedestal means and said third pedestal means with the corner members of a first end of said first cargo container located to cooperate with said first pedestal means and the corner members of a second end of said second cargo container located to cooperate with said third pedestal means.

7. A system for transporting wind turbine tower sections having flanges with holes to accommodate bolts, the system comprising:

a) a movable transportation device having a first end and a second end;

b) first deck slot pedestal means affixed to the floor of the first end of said movable transportation device;

c) second deck slot pedestal means affixed to the floor of said movable transportation device and spaced apart from said first deck slot pedestal means;

d) end stop means affixed to the floor of the first end of said movable transportation device;

e) a first tower bracket connected to said first deck slot pedestal means, said first tower bracket being constrained from lateral motion by said end stop means, and said first tower bracket comprising a plurality of ports located to correspond to a plurality of holes in a flange of a tower section; and, f) a second tower bracket connected to said second deck slot pedestal means.

8. A system according to claim 7 wherein said first deck slot pedestal means is connected to said first tower bracket by twist lock connectors.

9. The process for transporting a wind turbine on a movable transportation device, the process comprising:

a. partially disassembling the wind turbine into three types of components, nacelles, blades and tower sections;

b. storing the blades in cargo containers suitable for use in multi-mode transportation;

c. mounting the nacelles on transport structures; and, d. affixing brackets to the tower sections.

10. A process according to claim 9 further comprising the step of affixing a plurality of pedestals to the movable transportation device.

11. A process according to claim 10 further comprising the step of affixing a plurality of end stops to the movable transportation device.

12. A process according to claim 10 further comprising the step of temporarily connecting the brackets to a plurality of said pedestals.

13. A process according to claim 9 wherein the movable transportation device comprises a first railroad car and a second railroad car, and the process further comprises the step of temporarily mounting the cargo-containers to the first railroad car so that the cargo containers extend over the second railroad car while not being attached to the second railroad car.

14. A system for temporarily connecting a flange of a wind turbine tower section to a movable transportation device, said system comprising:

a) a bracket designed and constructed to be temporarily connected to the flange of the wind turbine tower section;

b) at least two pedestals connected to the movable transportation device; and, c) at least two locking members constructed and arranged to temporarily lock said bracket to said at least two pedestals.

15. A system according to claim 14 wherein said bracket comprises a vertical member with a plurality of ports.

16. A system according to claim 15 wherein said plurality of ports are located in said bracket so that when said vertical member is located adjacent to said flange at least two of said ports are aligned with bolt holes in said flange.

17. A system according to claim 16 wherein at least two of said ports are elongated to permit connection with said bolt holes in flanges of different sizes.

18. A system according to claim 14 wherein said bracket comprises two coupling members constructed to cooperate with said two locking members.

19. A system according to claim 18 wherein said bracket comprises a vertical member and said two coupling members are located one at each end of said vertical member.

20. A system according to claim 14 wherein said bracket comprises a base plate to cooperate with a flat surface of the transportation device.

21. A system according to claim 20 wherein the movable transportation device includes a deck, and said system further comprises at least two end stops affixed to the deck.

22. A system according to claim 21 wherein said two end stops are spaced apart from each other and said base plate can be temporarily located between said end stops so that said end stops constrain movement of said bracket.

23. A transportation system for transporting a wind turbine tower section, the transportation system comprising:

a) a movable transportation device having a deck;

b) first type of mounting system affixed to the deck of said movable transportation device; and, c) second type of mounting system affixed to the deck of said movable transportation device and spaced apart from said first type of mounting system, said second type of mounting system comprising four pedestals;

wherein said first type of mounting system comprises two pedestals and said first type of mounting system further comprises a bracket which can be temporarily connected to a flange located at the first end of the wind turbine tower section.

24. A transportation system for transporting a wind turbine tower section, the transportation system comprising:

a) a movable transportation device having a deck;

b) first type of mounting system affixed to the deck of said movable transportation device; and, c) second type of mounting system affixed to the deck of said movable transportation device and spaced apart from said first type of mounting system, said second type of mounting system comprising four pedestals;

wherein:

said first type of mounting system comprises two pedestals each having a slot having a first length;

said second type of mounting system comprises four pedestals each having a slot having a second length, and said second length is longer than said first length.

25. A transportation system according to claim 24 wherein said second type of mounting system comprises a bracket which can be temporarily connected to a flange located at the second end of the wind turbine tower section, and said second type of mounting system is located so that two of said pedestals comprising said second type of mounting system can be temporarily connected to said bracket while two of said pedestals comprising said second type of mounting system are not connected to said bracket.

26. A transportation system for transporting a wind turbine tower section, the transportation system comprising:

a) a movable transportation device having a deck;

b) first type of mounting system affixed to the deck of said movable transportation device; and, c) second type of mounting system affixed to the deck of said movable transportation device and spaced apart from said first type of mounting system, said second type of mounting system comprising four pedestals;

wherein said first type of mounting system is spaced apart from said second type of mounting system at a distance so that a first wind turbine tower section having a first length can be temporarily connected between said first type of mounting system and a first set of pedestals of said second type of mounting system, and a second wind turbine tower section having a second length which is different from said first length can be temporarily connected between said first type of mounting system and a second set of pedestals of said second type of mounting system.

* * * * *